US007770795B2

(12) United States Patent
Takashima et al.

(10) Patent No.: US 7,770,795 B2
(45) Date of Patent: Aug. 10, 2010

(54) INFORMATION PROCESSING APPARATUS, INFORMATION RECORDING MEDIUM, INFORMATION PROCESSING METHOD, AND COMPUTER PROGRAM

(75) Inventors: Yoshikazu Takashima, Tokyo (JP); Kenjiro Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1135 days.

(21) Appl. No.: 11/279,531

(22) Filed: Apr. 12, 2006

(65) Prior Publication Data

US 2007/0194117 A1 Aug. 23, 2007

(30) Foreign Application Priority Data

Apr. 15, 2005 (JP) ............................ 2005-118712

(51) Int. Cl.
*G06K 7/10* (2006.01)
*G06K 7/14* (2006.01)

(52) U.S. Cl. ........................ 235/454; 235/494; 235/375

(58) Field of Classification Search ................. 235/454, 235/375, 487, 494; 713/189, 193
See application file for complete search history.

(56) References Cited

U.S. PATENT DOCUMENTS

| | | | | |
|---|---|---|---|---|
| 2003/0023847 | A1 * | 1/2003 | Ishibashi et al. | 713/169 |
| 2004/0010699 | A1 * | 1/2004 | Shao et al. | 713/189 |
| 2005/0005156 | A1 * | 1/2005 | Harper | 713/200 |
| 2005/0089162 | A1 * | 4/2005 | Kobayashi | 380/44 |
| 2008/0155700 | A1 * | 6/2008 | Ohmori et al. | 726/26 |

FOREIGN PATENT DOCUMENTS

| | | |
|---|---|---|
| JP | 2004-072342 | 7/2004 |
| JP | 2003-116100 | 4/2006 |

* cited by examiner

*Primary Examiner*—Edwyn Labaze
(74) *Attorney, Agent, or Firm*—K&L Gates LLP

(57) ABSTRACT

An information processing apparatus for recording information on an information recording medium is provided. The information processing apparatus includes a content cryptographic processor configured to generate encrypted content by executing encryption using a unit key associated with a content management unit that serves as a unit for controlling usage of content; a unit-key-file processor configured to generate a unit key file storing the unit key, and to encrypt the unit key file or constituent data of the unit key file using an encryption key that is generated using a seed whose value is updated in accordance with change in constituent data of unit keys included in the unit key file; and a data recorder configured to record the content management unit including the encrypted content as constituent data and the unit key file on the information recording medium according to a predetermined data recording format.

11 Claims, 38 Drawing Sheets

FIG. 12A

| CONTENT-MANAGEMENT-UNIT (CPS) SETTING UNIT | CONTENT-MANAGEMENT-UNIT IDENTIFIER (CPS UNIT ID) | CPS UNIT KEY |
|---|---|---|
| PLAYLIST 1 | CPS1 | Ku1 |
| PLAYLIST 2 | CPS2 | Ku1 |
| : | : | : |
| MENU THUMBNAIL | CPSn | Kun |

FIG. 12B

| CONTENT-MANAGEMENT-UNIT (CPS) SETTING UNIT | CONTENT-MANAGEMENT-UNIT IDENTIFIER (CPS UNIT ID) | CPS UNIT KEY |
|---|---|---|
| CLIP 1 | CPS1 | Ku1 |
| CLIP 2 | CPS2 | Ku1 |
| : | : | : |
| MENU THUMBNAIL | CPSn | Kun |

FIG. 13

| | Syntax | No. of bits |
|---|---|---|
| | CPS Unit Key File { | |
| | Unit_Key_Block_start_address | 32 |
| | Reserved for future use | 96 |
| 201 | Unit_Key_File_Header() | |
| 201 | For (I=0 ; I<X ; I++){ | (*1) |
| 201 | padding word#I | 16 |
| 201 | } | |
| 202 | Unit_Key_Block() | |
| 202 | For (J=0 ; J<Y ; J++){ | (*2) |
| 202 | padding word | 16 |
| 202 | } | |
| | } | |

(*1) X is decided to align the start byte of Unit_Key_Block() to 16 bytes boundary.
(*2) Y is decided to align the end of CPS Unit Key File to 16 bytes boundary.

FIG. 14A

| Syntax | No. of bits |
| --- | --- |
| Unit_Key_File_Header(){ | |
| Application_Type (= $2_{16}$) | 16 |
| Num_of_BD_Directory | 16 |
| For(I=0; I < Num_of_BD_Directory; I++){ | 16 |
| CPS_Unit_number for Menu Thumbnail#I | 16 |
| CPS_Unit_number for Mark Thumbnail#I | 16 |
| Num_of_Clip#I | 16 |
| For(J=0; J < Num_of_Clip; J++){ | |
| Clip_ID#J in Directory #I | 16 |
| CPS_Unit_number for Title#J in Directory #I | 16 |
| } | |
| } | |

FIG. 14B

| Syntax | No. of bits |
| --- | --- |
| Unit_Key_Block(){ | |
| Num_of_CPS_Unit | 16 |
| Reserved | 112 |
| For(I=0; I < Num_of_CPS_Unit; I++){ | |
| MAC of Usage Rules#I | 128 |
| MAC of Media ID#I | 128 |
| Encrypted CPS Unit Key for CPS Unit#I | 128 |
| } | |
| } | |

FIG. 17

| | Syntax | #bytes |
|---|---|---|
| | Unit_Key.inf(){ | |
| 301 | CPS_Unit_number for Menu Thumbnail | 2 |
| | CPS_Unit_number for Mark Thumbnail | 2 |
| | Num_of_PlayList (np) | 2 |
| | CPS_Unit_number for PlayList#1 | 2 |
| | ... | |
| | CPS_Unit_number for PlayList#np | 2 |
| 302 | Num_of_CPS_Unit (ncu) | 2 |
| | Encrypted Unit Key for CPS Unit#1 | 16 |
| | ... | |
| | Encrypted Unit Key for CPS Unit#ncu | 16 |
| | } | |

FIG. 18

```
                                                      #bytes
  Unit_Key.inf(){
      ( CPS_Unit_number for Menu Thumbnail             2
      | CPS_Unit_number for Mark Thumbnail             2
      | Num_of_PlayList (np)                           2
  311 { For(I = 0; I < np; I++){
      |         PlayList_ID(I)                         2   (VALUES FROM 00000 TO 99999)
      |         CPS_Unit_number for PlayList(I)        2
      ( }
      ( Num_of_CPS_Unit (ncu)                          2
  312 { For(J = 0; J < ncu; J++){
      |         Encrypted Unit Key for CPS Unit#J      16
      ( }
  }
```

FIG. 19

| | Syntax | #bytes |
|---|---|---|
| | Unit_Key.inf(){ | |
| 321 | CPS_Unit_number for Menu Thumbnail | 2 |
| | CPS_Unit_number for Mark Thumbnail | 2 |
| | Num_of_Clip (nc) | 2 |
| | CPS_Unit_number for Clip#1 | 2 |
| | ... | |
| | CPS_Unit_number for Clip#nc | 2 |
| 322 | Num_of_CPS_Unit (ncu) | 2 |
| | Encrypted Unit Key for CPS Unit#1 | 16 |
| | ... | |
| | Encrypted Unit Key for CPS Unit#ncu | 16 |
| | } | |

FIG. 20

```
                                                          #bytes
Unit_Key.inf(){
     ( CPS_Unit_number for Menu Thumbnail                  2
     | CPS_Unit_number for Mark Thumbnail                  2
     | Num_of_Clip (nc)                                    2
 331 { For(I = 0; I < nc; I++){
     |         Clip_ID(I)                                  2   (VALUES FROM 00000 TO 99999)
     |         CPS_Unit_number for Clip(I)                 2
     ( }
     ( Num_of_CPS_Unit (ncu)                               2
 332 { For(J = 0; J < ncu; J++){
     |         Encrypted Unit Key for CPS Unit#J           16
     ( }
}
```

FIG. 21

```
                                                        #bytes
Unit_Key.inf(){
      Encrypted Key for Menu Thumbnail                  16
      Encrypted Key for Mark Thumbnail                  16
      Num_of_PlayList (np)                              2
341         Encrypted Key for PlayList#1                16
                  ...
            Encrypted Key for PlayList#np               16
}
```

FIG. 22

```
                                                    #bytes
Unit_Key.inf(){
      Encrypted Key for Menu Thumbnail              16
      Encrypted Key for Mark Thumbnail              16
      Num_of_PlayList (np)                          2
351   For(I=0; I < np; I++){
            PlayList_ID(I)                          2    (VALUES FROM 00000 TO 99999)
            Encrypted Key for PlayList(I)           16
      }
}
```

FIG. 23

| Syntax | #bytes |
|---|---|
| Unit_Key.inf(){ | |
| Encrypted Key for Menu Thumbnail | 16 |
| Encrypted Key for Mark Thumbnail | 16 |
| Num_of_Clip (nc) | 2 |
| Encrypted Key for Clip#1 | 16 |
| ... | |
| Encrypted Key for Clip#nc | 16 |
| } | |

```
Unit_Key.inf(){                                          #bytes
     Encrypted Key for Menu Thumbnail                    16
     Encrypted Key for Mark Thumbnail                    16
     Num_of_Clip (np)                                    2
371  For(I = 0; I < nc; I++){
         Clip_ID(I)                                      2     (VALUES FROM 00000 TO 99999)
          Encrypted Key for Clip#nc                      16
}
```

CASE WHERE SIZE OF UNIT KEY FILE IS 2KB OR SMALLER
441
442
BIND SEED (16B)
UNIT KEY FILE
another data
another data
...
User Control Data (18B)
User Data (2048B) = 2KB SECTOR CASE WHERE SIZE OF UNIT KEY FILE IS LARGER THAN 2KB
443
444
445
BIND SEED (16B)
UNIT KEY FILE_0
UNIT KEY FILE_1
another data
...

UNIT KEY FILE IS RECORDED IN TWO SEGMENTS
446
447
448
BIND SEED (16B)
UNIT KEY FILE_0
another data
...
UNIT KEY FILE_1

FIG. 28

| Byte \ Bit | 7 | 6 | 5 | 4 | 3 | 2 | 1 | 0 |
| --- | --- | --- | --- | --- | --- | --- | --- | --- |
| 0 | (msb) | | | | | | | |
| . . . | | | | BIND SEED | | | | |
| 15 | | | | | | | | (lsb) |
| 16 | | | | Reserved | | | | |
| 17 | | | | | | | | |

INFORMATION PROCESSING APPARATUS, INFORMATION RECORDING MEDIUM, INFORMATION PROCESSING METHOD, AND COMPUTER PROGRAM

CROSS REFERENCES TO RELATED APPLICATIONS

The present application claims priority to Japanese Patent Application JP 2005-118712 filed in the Japanese Patent Office on Apr. 15, 2005, the entire contents of which are incorporated herein by reference.

BACKGROUND

The present application relates to information processing apparatuses, information recording media, information processing methods, and computer programs. More specifically, the present application relates to, for example, an information processing apparatus, an information recording medium, an information processing method, and a computer program for controlling usage of content in divided units in a scheme where content such as digital broadcast content is recorded on an information recording medium and the content recorded is used.

Various types of software data (hereinafter referred to as "content"), for example, audio data such as music, image data such as movies, game programs, and various application programs, can be stored as digital data in recording media, such as a Blu-ray disc®, which employs blue lasers, a digital versatile disc (DVD), a mini disc (MD), and a compact disc (CD). In particular, a Blu-ray disc®, which employs blue lasers, allow high-density recording, so that a large volume of video content or the like can be recorded at a high quality.

These various types of information recording media include read-only memory (ROM) media that has data recorded thereon in advance and that do not allow writing new data thereon and writable media that allow writing data thereon. Using a writable information recording medium, for example, a user can receive content through digital data broadcasting, write the content received on the information recording medium, and play back and use the content.

Generally, the copyrights and distribution rights of many items of content, such as broadcast content, music data, and image data, are owned by creators or vendors of the content. Accordingly, when distributing the content, usually, certain usage restrictions are imposed, i.e., only authorized users are permitted to use the content so that unauthorized copying or the like is prohibited.

Digital recording apparatuses and recording media allow repeated recording and playback of, for example, image or sound without degrading the quality thereof. Accordingly, the distribution of illegitimately copied content via the Internet, the distribution of what are called pirate discs manufactured by copying content on CD-Rs or the like, or the use of copied content stored on hard discs of personal computers (PCs) or the like causes the problem of copyright infringement.

A high-capacity recording media, such as a DVD or a type of recently developed recording medium employing blue lasers, can record a large volume of data, for example, corresponding to one or several movies, on a single medium in the form of digital information. As it becomes possible to record video information or the like in the form of digital information, it becomes increasingly important to protect copyright owners by preventing unauthorized copying. Recently, in order to prevent unauthorized copying of such digital data, various techniques for preventing illegitimate copying have been implemented in digital recording apparatuses and recording media.

For example, a content scramble system is employed for DVD players. In the content scramble system, video data, audio data, or the like is recorded on a DVD-ROM in an encrypted form, a key for decrypting the encrypted data is assigned to a DVD player having a license. The license is provided to a DVD player that is designed so as to comply with predetermined operation rules, such as not performing unauthorized copying. Thus, the DVD player having the license can play back image and sound from the DVD-ROM by decrypting the encrypted data recorded on the DVD-ROM using the key assigned.

On the other hand, a DVD player not having a license is not allowed to playback the encrypted data recorded on the DVD-ROM since the DVD player does not have the key for decrypting the encrypted content. As described above, in the content scramble system, a DVD player that does not satisfy certain conditions at the time of licensing is not allowed to play back digital data recorded on a DVD-ROM, so that unauthorized copying is prevented.

A scheme for controlling usage of content through encryption of content in recording and playback of content on and from an information recording medium that allows recording data thereon is described, for example, in Japanese Unexamined Patent Application Publication No. 2003-116100.

Content that is recorded on information recording media include various types of content. Thus, a scheme in which usage of pieces of content is managed individually, for example, in which usage of pieces of content is managed in different modes according to content providers, is desired. Furthermore, a scheme of management has not been established for processing of an encryption key that is executed when stored content is changed as in a case where content is moved. That is, existing systems are not sufficiently convenient for content management and key management.

Japanese Unexamined Patent Application Publication No. 2004-72342 discloses a scheme of deleting an encryption key used for decryption when a move is executed. However, when an encryption key is managed as a file that can be manipulated by a user, it is not necessarily safe enough to simply "delete" the encryption key saved in the file. That is, when the encryption key is deleted logically instead of physically, or when physical deletion is not complete, decryption could be possible if data of the encryption key remains on the disc.

There is a need for an information processing apparatus, an information recording medium, an information processing method, and a computer program for individually controlling usage of pieces of content, such as content stored on an information recording medium or content recorded by a user, and for allowing strict management of encryption keys even when content stored is changed, for example, when content is moved.

SUMMARY

According to an embodiment, there is provided an information processing apparatus for recording information on an information recording medium, the information processing apparatus including a content cryptographic processor configured to generate encrypted content by executing encryption using a unit key associated with a content management unit that serves as a unit for controlling usage of content; a unit-key-file processor configured to generate a unit key file storing the unit key, and to encrypt the unit key file or constituent data of the unit key file using an encryption key that is generated using a seed whose value is updated in accordance with change in constituent data of unit keys included in the unit key file; and a data recorder configured to record the content management unit including the encrypted content as constituent data and the unit key file on the information recording medium according to a predetermined data recording format.

The unit-key-file processor may be configured to set a new seed having a new value in accordance with an increase in the number of unit keys included in an existing unit key file recorded on the information recording medium or deletion of a unit key from the existing unit key file, and to generate an updated unit key file that is encrypted using a new encryption key based on the new seed.

Also, the unit-key-file processor may be configured to store in the unit key file a new unit key that is newly set in accordance with recording of a new content management unit on the information recording medium, to set a new seed having a new value in accordance with addition of the new unit key, and to generate an updated unit key file that is encrypted using a new encryption key based on the new seed.

Also, the unit-key-file processor may be configured to delete from the unit key file a unit key associated with a content management unit that is to be moved or deleted in accordance with a move or deletion of the content management unit from the information recording medium, to set a new seed having a new value in accordance with the move of the unit key, and to generate an updated unit key file that is encrypted using a new encryption key based on the new seed.

Also, the unit-key-file processor may be configured to encrypt the unit key file or the constituent data of the unit key file using an encryption key that is generated through encryption of the seed using a media key, the media key being obtained by processing of an encryption-key block using a device key stored in the information processing apparatus.

The data recorder may be configured to record the seed in a user control data area that serves as a control information storage area, the user control data area being set at a recording location different from a recording location of a user data area where the unit key file is stored.

Also, the data recorder may be configured to write the unit key file according to a recording format in which an area for writing the unit key file is set using an error-correcting-code block as a unit for accessing data on the information recording medium.

Also, the data recorder may be configured to change a writing location on the information recording medium in accordance with the number of times of writing of or the number of times of access to the unit key file when writing the unit key file.

Also, the data recorder may be configured to change a writing location on the information recording medium in accordance with the number of times of writing of or the number of times of access to the unit key file when writing the unit key file, and to delete at least a part of data written to a location before changing the writing location.

The data deleted may include seed information.

The information processing apparatus may further include a drive that executes access to the information recording medium; and a host that executes processing for accessing the information recording medium via the drive, the drive being configured to generate the seed, and the host being configured to generate an encryption key using the seed generated by the drive, and to generate a unit key file encrypted using the encryption key.

According to another embodiment, there is provided a host computer that executes processing for accessing an information recording medium via a drive that executes access to the information recording medium, the information recording medium being used to record thereon content encrypted using a unit key, the unit key being included in a unit key file and associated with a content management unit that serves as a unit for controlling usage of content. The host computer includes a receiver configured to receive a seed generated by the drive in accordance with change in constituent data of the unit key file; a media-key generator configured to generate a media key using a device key of the host; a bind-key generator configured to generate a bind key by applying the seed received to the media key generated; a unit-key generator configured to generate a unit key; and an encrypted-unit-key generator configured to generate an encrypted unit key by encrypting the unit key using the bind key.

According to another embodiment, there is provided a drive that executes access to an information recording medium in response to a request from a host computer, the information recording medium being used to record thereon content encrypted using a unit key, the unit key being included in a unit key file and associated with a content management unit that serves as a unit for controlling usage of content. The drive includes a generator configured to generate a seed in accordance with change in constituent data of the unit key file; a transmitter configured to transmit the seed generated to the host computer; and a recorder configured to receive the unit key file from the host computer and to record the unit key file on the information recording medium; the unit key file being a file generated by the host computer by generating a media key using a device key of the host computer, applying the seed received from the drive to the media key to generate a bind key, and encrypting the unit key using the bind key.

According to another embodiment, there is provided an information processing apparatus for playing back content recorded on an information recording medium, the information processing apparatus including a data obtaining unit configured to read data recorded on the information recording medium; a unit-key-file processor configured to obtain a unit key from a unit key file recorded on the information processing apparatus, the unit key being associated with a content management unit that is defined as a unit for controlling usage of content; and a content cryptographic processor configured to decrypt, using the unit key, encrypted content recorded on the information recording medium; wherein the unit-key-file processor being configured to generate an encryption key using a seed obtained from the information recording medium, the seed serving as key-generation information, and to obtain the unit key by decrypting the unit key file or constituent data of the unit key file using the encryption key generated.

The unit-key-file processor may be configured to decrypt the unit key file or the constituent data of the unit key file using an encryption key generated by encrypting the seed using a media key, the media key being obtained through processing of an encryption-key block using a device key stored in the information processing apparatus.

The data obtaining unit may be configured to obtain the seed from a user control data area that serves as a control information storage area, the user control data area being set at a recording location different from a recording location of a user data area where the unit key file is stored.

The information processing apparatus may further include a drive that executes access to the information recording medium; and a host that executes processing for accessing the information recording medium via the drive; the drive being configured to generate the seed, and the host being configured to generate an encryption key using the seed generated by the drive, and to obtain the unit key by decrypting the unit key file or the constituent data of the unit key file using the encryption key.

According to another embodiment, there is provided an information recording medium having stored thereon content management units including constituent data that is encrypted using unit keys associated with the content management units, the content management units being defined as units for controlling usage of content; a unit key file storing the unit keys, the unit key file or constituent data of the unit key file being encrypted using an encryption key that is generated using a seed whose value is updated in accordance with change in constituent data of the unit keys included in the unit key file; and the seed.

The seed may be recorded in a user control data area that serves as a control information storage area, the user control data area being set at a recording location different from a recording location of a user data area where the unit key file is stored.

An area for writing the unit key file may be set using an error-correcting-code block as a unit for accessing data on the information recording medium.

According to another embodiment, there is provided an information processing method for recording information on an information recording medium, the information processing method including the steps of generating encrypted content by executing encryption using a unit key associated with a content management unit that serves as a unit for controlling usage of content; generating a unit key file storing the unit key, and encrypting the unit key file or constituent data of the unit key file using an encryption key that is generated using a seed whose value is updated in accordance with change in constituent data of unit keys included in the unit key file; and recording the content management unit including the encrypted content as constituent data and the unit key file on the information recording medium according to a predetermined data recording format.

According to another embodiment, there is provided an information processing method for playing back content recorded on an information recording medium, the information processing method including the steps of reading data recorded on the information recording medium; obtaining a unit key from a unit key file recorded on the information processing apparatus, the unit key being associated with a content management unit that is defined as a unit for controlling usage of content; and decrypting, using the unit key, encrypted content recorded on the information recording medium. An encryption key is generated using a seed obtained from the information recording medium, the seed serving as key-generation information, and the unit key is obtained by decrypting the unit key file or constituent data of the unit key file using the encryption key generated.

According to another embodiment, there is provided a computer program for allowing a computer to execute a process of recording information on an information recording medium, the computer program including the steps of generating encrypted content by executing encryption using a unit key associated with a content management unit that serves as a unit for controlling usage of content; generating a unit key file storing the unit key, and encrypting the unit key file or constituent data of the unit key file using an encryption key that is generated using a seed whose value is updated in accordance with change in constituent data of unit keys included in the unit key file; and recording the content management unit including the encrypted content as constituent data and the unit key file on the information recording medium according to a predetermined data recording format.

According to another embodiment, there is provided a computer program for allowing a computer to execute a process of playing back content recorded on an information recording medium, the computer program including the steps of reading data recorded on the information recording medium; obtaining a unit key from a unit key file recorded on the information processing apparatus, the unit key being associated with a content management unit that is defined as a unit for controlling usage of content; and decrypting, using the unit key, encrypted content recorded on the information recording medium. An encryption key is generated using a seed obtained from the information recording medium, the seed serving as key-generation information, and the unit key is obtained by decrypting the unit key file or constituent data of the unit key file using the encryption key generated.

These computer programs according to embodiments can be provided, for example, using storage media that allow providing the computer programs in computer-readable forms to computer systems capable of executing various program codes, for example, recording media such as a DVD, a CD, or an MO, or via communication media such as a network. By providing the programs in computer-readable forms, processing according to the programs is executed on the computer systems.

Other objects, features, and advantages of the present invention will become apparent from the following detailed description of embodiments with reference to the accompanying drawings. In this specification, a system refers to a logical combination of a plurality of apparatuses, and is not limited to one in which constituent apparatuses exist within the same case.

According to an embodiment, encrypted data associated with a content management unit (CPS (content protection system) unit) that is defined as a unit for controlling usage of content is generated through encryption using a unit key associated with the content management unit, and a unit key file storing the unit key is generated or updated and recorded on an information recording medium as management information. When content is played back and used, a key is obtained from the unit key file. The unit key file or constituent data of the unit key file is encrypted using an encryption key that is generated using a seed whose value is updated in accordance with change in constituent data of unit keys included in the unit key file. Thus, seed information is changed in accordance with change in stored content, for example, when a content management unit is moved. Accordingly, unit keys can be managed while maintaining association with pieces of content stored on an information recording medium. This serves to prevent illegitimate use of content through illegitimate use of unit keys.

Furthermore, according to an embodiment, an area for writing a unit key file is set using an error-correcting-code block as a unit, the unit key file can be read and written efficiently. Furthermore, according to an embodiment, an area for writing a unit key file is changed as needed. Thus, remaining of recorded data of a plurality of unit key files in spare areas due to occurrence of a plurality of times of write error can be prevented.

Additional features and advantages are described herein, and will be apparent from, the following Detailed Description and the figures.

BRIEF DESCRIPTION OF THE FIGURES

FIGS. 12A and 12B are diagrams showing association between content management units (CPS units) and CPS unit keys;

FIG. 13 is a diagram showing an example of the structure of a CPS unit key file storing CPS unit keys associated with content management units (CPS units);

FIGS. 14A and 14B are diagrams showing an example of the structure of a CPS unit key file storing CPS unit keys associated with content management units (CPS units);

FIG. 17 is a diagram showing an example of the structure of a CPS unit key file;

FIG. 18 is a diagram showing an example of the structure of a CPS unit key file;

FIG. 19 is a diagram showing an example of the structure of a CPS unit key file;

FIG. 20 is a diagram showing an example of the structure of a CPS unit key file;

FIG. 21 is a diagram showing an example of the structure of a CPS unit key file;

FIG. 22 is a diagram showing an example of the structure of a CPS unit key file;

FIG. 23 is a diagram showing an example of the structure of a CPS unit key file;

FIG. 24 is a diagram showing an example of the structure of a CPS unit key file;

FIG. 28 is a diagram showing a format of user control data including a bind seed;

DETAILED DESCRIPTION

Now, information processing apparatuses, information processing methods, and computer programs according to embodiments of the present invention will be described in detail with reference to the drawings. The description will be given in the following order of topics:

1: Overview of Content Storage Format
2. Scheme of Content Management
   (2.1) Scheme of encryption based on individual pieces of data
   (2.2) Scheme of management based on content management units (CPS units)
   (2.3) Scheme of management based on content management units (CPS units) for allowing cross-playlist editing
3. Structure of Unit Key File
4. Scheme of Encryption of Unit Key File using Bind Seed
5. Processes of Recording and Reading Unit Key File and Processes of Recording and Playing Back Content
6. Scheme of Recording of Unit Key File on Information Recording Medium
7. Processes of Recording, Editing, and Playing Back Content
8. Example Configuration of Information Processing Apparatus

1. Overview of Content Storage Format

Figure 1:
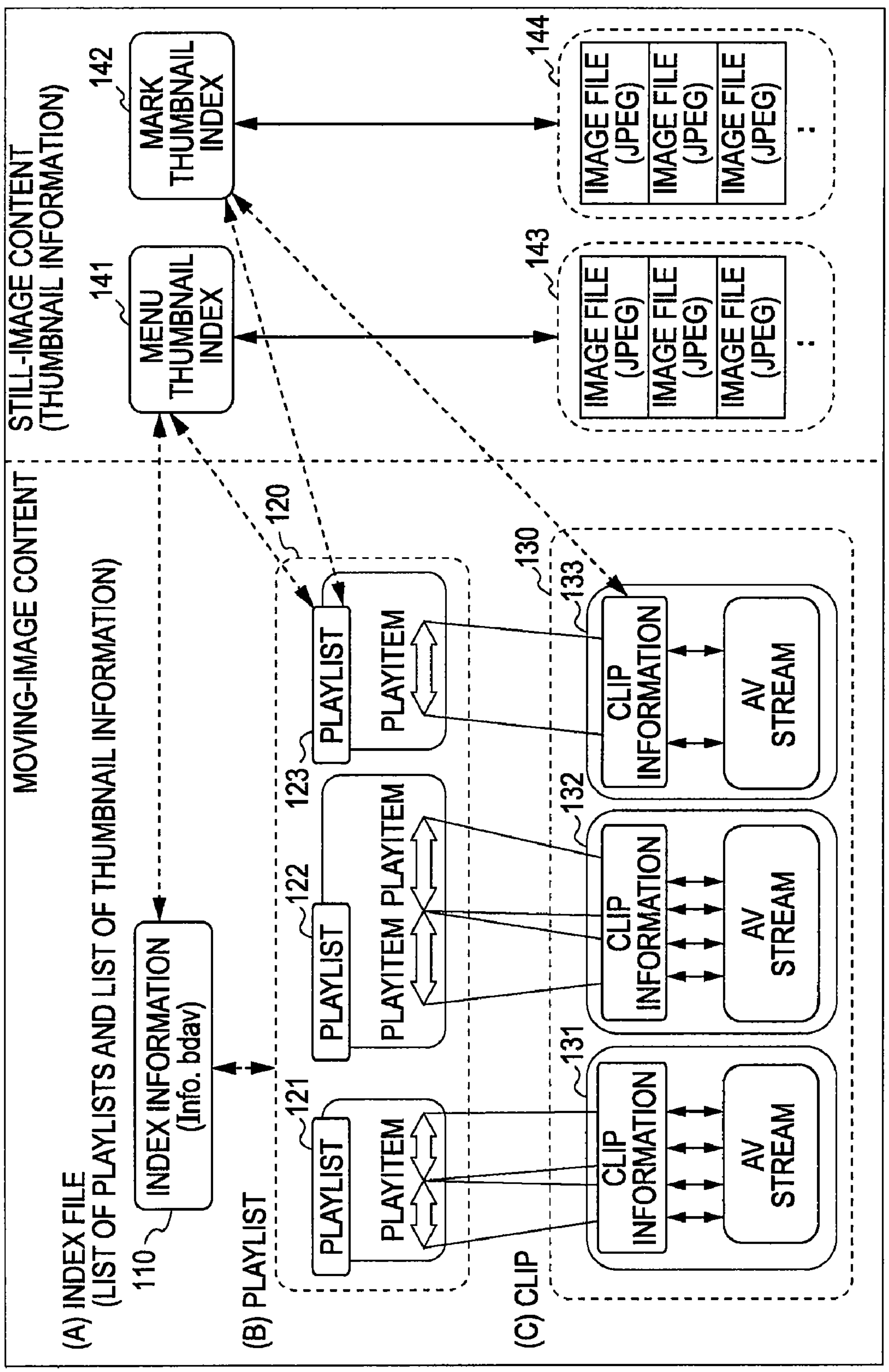
FIG. 1 is a diagram showing a recording format of data stored on an information recording medium.

FIG. 1 is a diagram showing the structure of a content storage format on an information recording medium that is mounted on an information processing apparatus according to an embodiment of the present invention and used for recording and playing back data. The diagram shows the structure of a content storage format in a case where, for example, broadcast content or the like is recorded on an information recording medium using an application program for recording data.

As shown in FIG. 1, content can be classified into moving-image content and still-image content. Moving-image content has a hierarchical structure of (A) an index information file 110, (B) playlists 120, and (C) clips 130. In the layer of (B) playlists 120, a plurality of playlists 121 to 123 is included. In the layer of (C) clips 130, a plurality of pieces of clip information and clip AV stream files 131 to 133 composed of AV streams as actual content data are included.

The index information file 110 is retrieved by a playback application that is executed by an information processing apparatus having the information recording medium mounted thereon, and one of the playlists 121 to 123, or a menu thumbnail index 141 or a mark thumbnail index 142 of still-image content is selected from the index information 110 as specified by a user.

When moving-image content is played back, one of the playlists 121 to 123 is selected. Each playlist includes playitems as data information that is to be played back. On the basis of clip information representing playback segments defined by the playitems included in the playlist, an AV stream as actual content data is read selectively and the AV stream is played back. A large number of playlists and playitems exists, and each has a playlist ID or playitem ID as identification information associated therewith.

Generally, a data file used in a computer or the like is handled as a byte sequence. The content of the clip AV stream files 131 to 133 is expanded on a temporal axis, and a playlist specifies access points in the clips mainly by timestamps. When a playlist indicates access points in the clips by timestamps, a clip information file is used to find an address where decoding of a stream is to be started in a clip AV stream file.

By using the playlists 120, a user can select playback segments the user wishes to view from the clips 130 and readily edit the playback segments. Each playlist is a collection of playback segments in a clip. Each playback segment in a clip is referred to as a playitem, which is represented by a pair of an IN point and an OUT point on the temporal axis. A playlist is defined as a set of playitems.

As shown in FIG. 1, on the information recording medium, still-image content as well as moving-image content is recorded. Still-image content includes thumbnails. The thumbnails are, for example, still images corresponding to individual pieces of moving-image content. Two types of thumbnail exist, as shown in FIG. 1. One is a menu thumbnail that serves as a representative image representing a piece of content. The menu thumbnail is mainly used in a menu screen for allowing the user to select an image the user wishes to view by operating a cursor. The other is a mark thumbnail, which is an image representing a scene indicated by a mark. The mark thumbnail is composed, for example, by a thumbnail image of a scene selected by the user.

For example, JPEG image files 143 and 144 are set as these thumbnails. A still image to be displayed can be selected using either a menu thumbnail index 141 or a mark thumbnail index 142.

2. Scheme of Content Management

Now, a plurality of schemes for controlling usage of content stored on an information recording medium using the file format described above will be described.

2.1 Scheme of Encryption Based on Individual Pieces of Data

Figure 2:
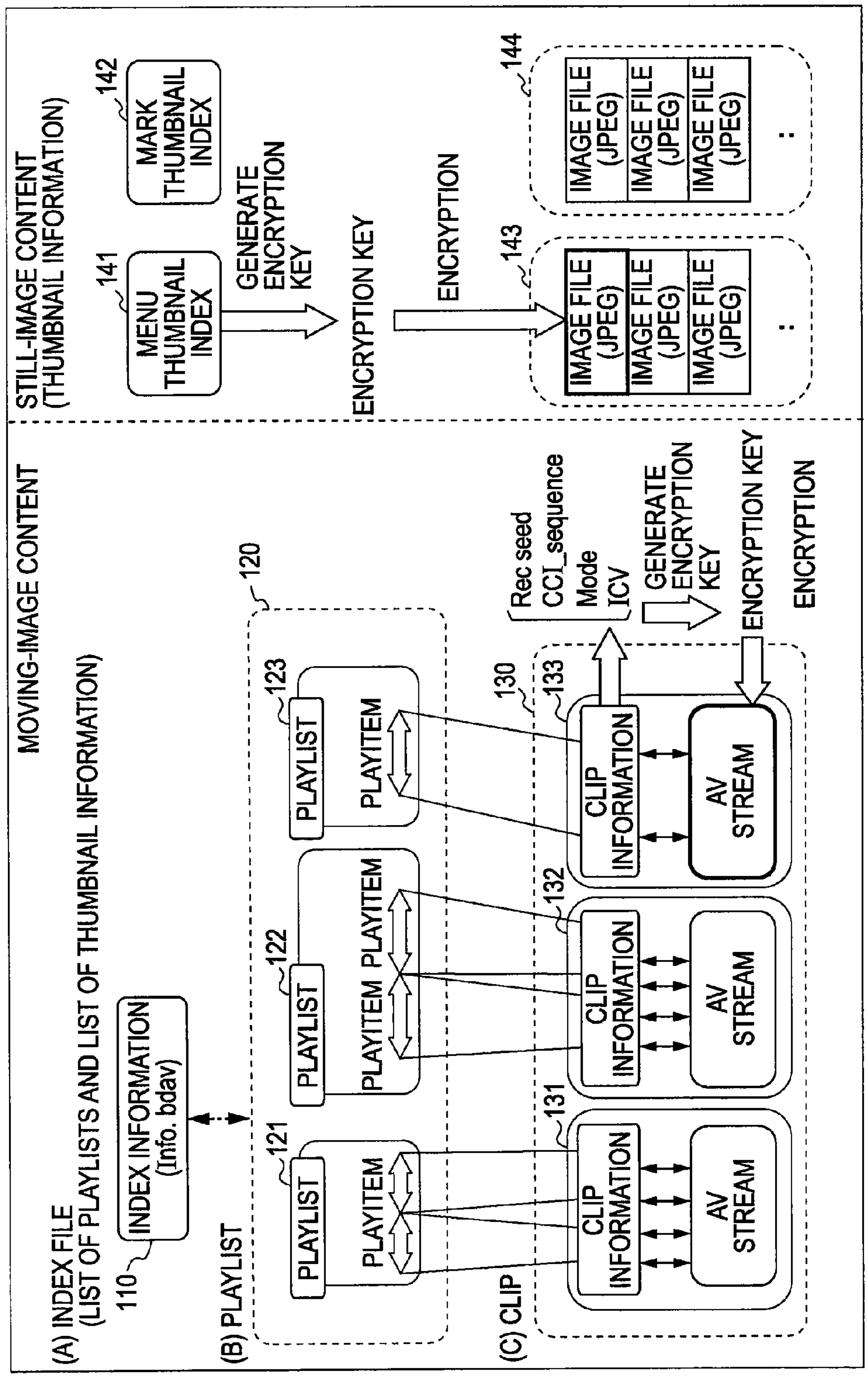
FIG. 2 is a diagram showing an example scheme of encryption of data stored on an information recording medium.

Referring first to FIG. 2, a scheme of encryption based on individual pieces of data will be described. In this example scheme, as shown in FIG. 2, data that is to be encrypted is an AV stream in moving-image content and a still-image file in still-image content, and these pieces of actual content data are encrypted individually.

An encryption key that is used to encrypt an AV stream in moving-image content is generated through an encryption-key generating process using data included in clip information that is set in association with the AV stream to be encrypted. For example, an encryption key is generated using input of data recorded in the clip information, such as a recording seed (Rec Seed), a CCI (Copy Control Information) sequence that serves as usage control information of the content, mode information, or an ICV (Integrity Check Value) for verifying data integrity, and the AV stream is encrypted, for example, by 6-KB block encryption using the encryption key generated.

An encryption key that is used to encrypt a still-image file composed of a thumbnail image is generated using input of data such as a recording seed (Rec Seed) obtained from information included in a menu thumbnail index or a mark thumbnail index that is set in association with the thumbnail image to be encrypted, and the image file is encrypted, for example, by 2-KB encryption using the encryption key generated.

Although a scheme of encryption of a single AV stream and a single still-image file has been described with reference to FIG. 2, other AV streams are also encrypted individually using encryption keys based on constituent data of associated pieces of clip information, and image files including thumbnails are also individually encrypted using encryption keys generated from information included in a menu thumbnail index or a mark thumbnail index. According to the scheme described above, for example, even when an encryption key for a certain AV stream is leaked, the key is not applicable as encryption keys for other AV streams. Thus, pieces of content can be managed individually, so that more robust data protection can be achieved.

2.2 Scheme of Management Based on Content Management Units (CPS Units)

Next, a scheme of content management based on setting of content management units (CPS units) will be described with reference to FIG. 3. In this example scheme, content stored on an information recording medium is encrypted using different keys assigned to individual units so that the usage of the individual units can be controlled in different ways. That is, content is divided into content management units (CPS units), and the CPS units are encrypted using individual keys (CPS units keys) so that the usage of the CPS units can be managed individually.

When the content is used, CPS unit keys assigned to individual units are obtained, and the content is played back by executing data processing according to a predetermined decoding process sequence using other keys, key generation information, and so forth in addition to the CPS unit keys.

Various modes of setting are possible for content management units (CPS units). One mode of setting for content management units (CPS units) will be described with reference to FIG. 3.

Figure 3:
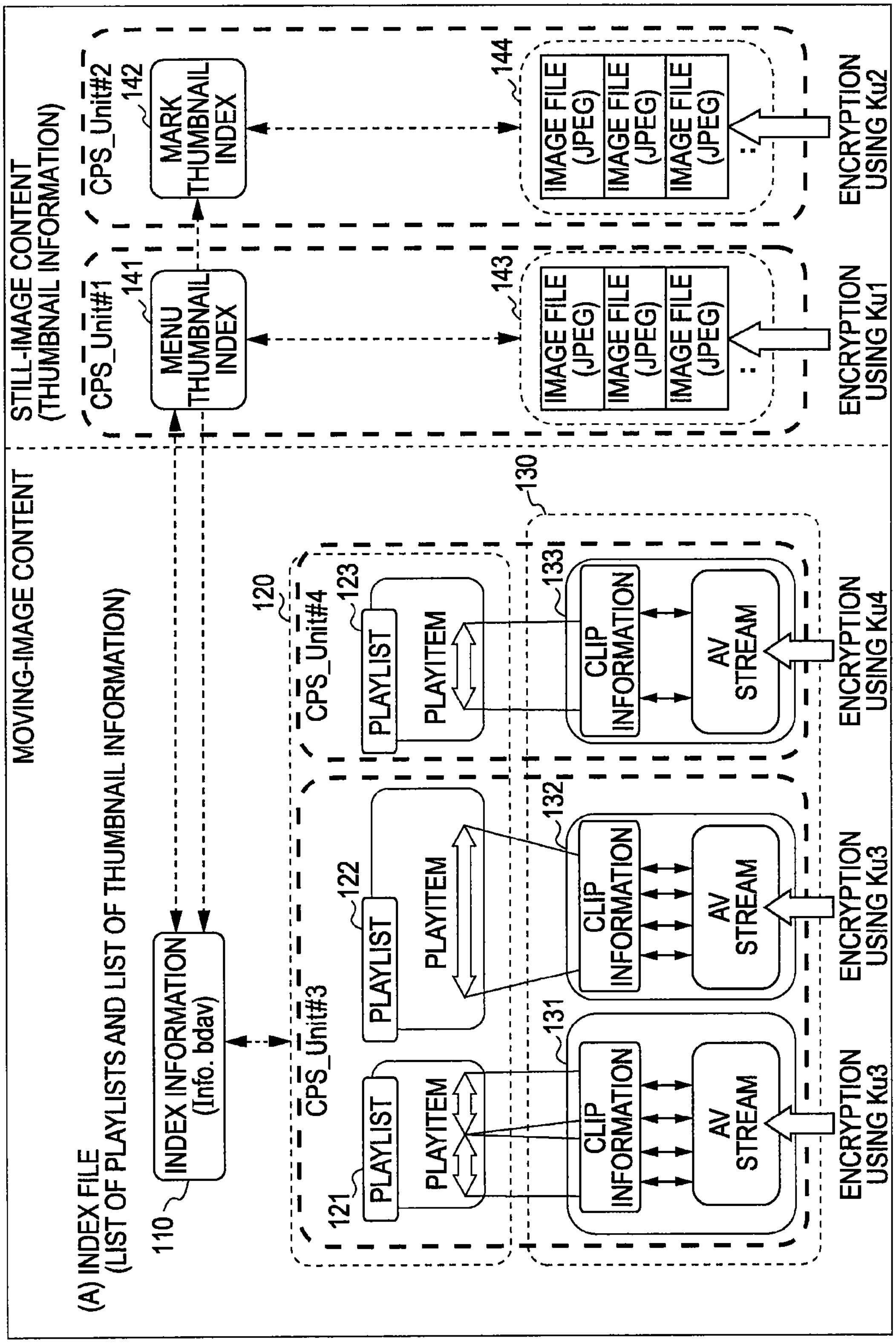
FIG. 3 is a diagram showing an example setting of a content management units (CPS units) corresponding to data stored on an information recording medium.

In the example shown in FIG. 3, as for moving-image content, content management units (CPS units) associated with one or more playlists are set, and as for still-image content, content management units (CPS units) are set individually for a menu thumbnail and a mark thumbnail.

In the case of still-image content, a set of image files of menu thumbnails is defined as a CPS unit 1 (content management unit 1), and the CPS unit 1 is encrypted using a unit key [Ku1] associated with the CPS unit 1. In this example, data that is to be encrypted is an image file. Also, a set of image files of mark thumbnails is defined as a CPS unit 2, and the CPS unit 2 is encrypted using a unit key [Ku2] associated with the CPS unit 2.

In the case of moving-image content, data including clip files specified by a playlist 121 and a playlist 122 is defined as a CPS unit 3, and the CPS unit 3 is encrypted using a unit key [Ku3] associated with the CPS unit 3. In this example, data that is to be encrypted is an AV stream. Furthermore, data including a clip file specified by a playlist 123 is defined as a CPS unit 4, and the CPS unit 4 is encrypted using a unit key [Ku4] associated with the CPS unit 4.

For example, when the user wishes to play back content corresponding to the CPS unit 3, the unit key Ku3, i.e., the encryption key set in association with the CPS unit 3, is obtained for decoding. When the user wishes to play back content corresponding to the CPS unit 4, the unit key Ku4, i.e., the encryption key set in association with the CPS unit 4, is obtained for decoding.

With this setting, the usage of individual units of content is controlled in different ways. In order to individually manage the usage of individual content management units (CPS units), content usage control information (CCI) for each content management unit (CPS unit) is set, so that the usage of each CPS unit can be controlled according to the associated content usage control information (CCI).

Figure 4:
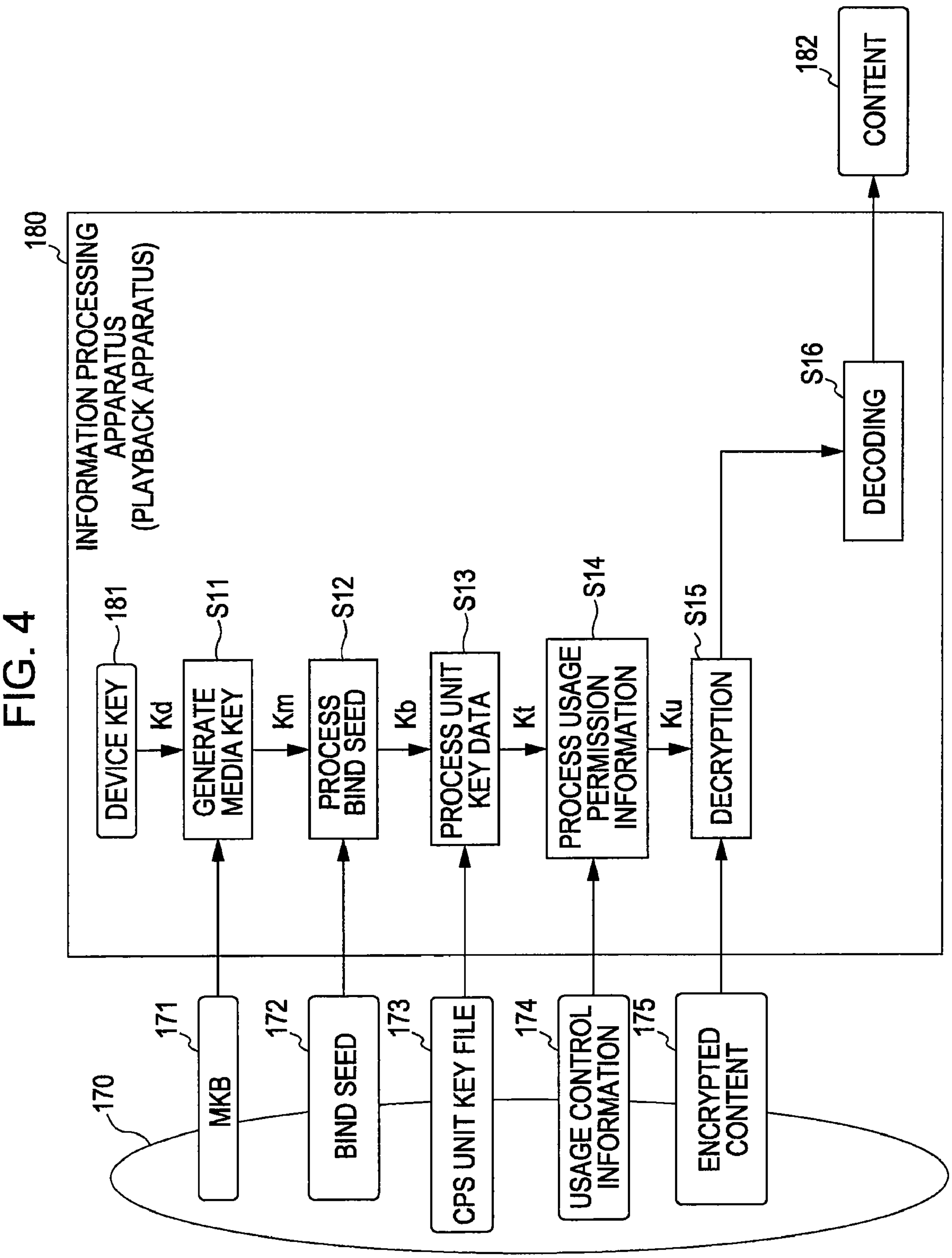
FIG. 4 is a diagram showing a playback sequence of content recorded as a content management unit (CPS unit)

A process of playing back and using content on an information recording medium having recorded thereon content that is managed according to the scheme based on content management units (CPS units) will be described with reference to FIG. 4. First, an information processing apparatus 180 reads a device key [Kd] 181 stored in a memory. The device key 181 is a secret key stored in an information processing apparatus having received a license for usage of content.

Then, in step S11, the information processing apparatus 180 decodes an MKB (Media Key Block) 171 using the device key 181 to obtain a media key Km. The MKB 171 is an encryption key block storing the media key Km and stored on an information recording medium 170. The MKB 171 is an encryption key block that is generated according to a tree-structure key distribution scheme known as a type of broadcast encryption. The MKB 171 is a key information block that allows a media key [Km] used for decoding of content to be obtained only through decoding with a device key [Kd] stored in an information processing apparatus of a user having a valid license. This is implemented by an information distribution scheme based on a hierarchical tree structure. A user device (information processing apparatus) is allowed to obtain the media key [Km] only when the user device has a valid license, and a revoked user device is not allowed to obtain the media key [Km].

Then, in step S12, a bind key Kb that serves as an encryption key is generated by encryption based on the media key Km obtained through the MKB processing in step S11 and a bind seed 172 read from the information recording medium 170. The key generation is executed according to, for example, the AES encryption algorithm. The bind seed will be described later in detail.

Then, in step S13, a CPS unit key file 173 read from the information recording medium 170 is decoded using the bind key Kb. The CPS unit key file 173 is a file storing encrypted data of unit keys [Ku_n] that are set in association with individual CPS units. The specific structure of the CPS unit key file 173 will be described later. For example, unit keys are stored in the form of encrypted data, such as [Enc(Kb, f(Ku_n, CCI))]. Enc(a, b) denotes encrypted data generated by encrypting data b using a key a.

Through the decoding of the CPS unit key file 173 in step S13, data [Kt]=f(Ku_n, CCI) is obtained. Then, in step S14, an operation is executed on data [Kt]=f(Ku_n, CCI) using usage control information (CCI) 174 read from the information recording medium 170 to obtain a unit key [Ku_n].

For example, when data [Kt]=f(Ku_n, CCI) is a result of an exclusive-OR (XOR) operation between the unit key [Ku_n] and the usage control information [CCI], the unit key [Ku_n] can be obtained by again executing an exclusive-OR (XOR) operation on the result of operation with the usage control information [CCI] read from the information recording medium 170.

Then, in step S15, a decryption process (e.g., AES_D) of encrypted content 175 read from the information recording medium 170 is executed using the unit key [Ku_n]. In step S16, decoding, such as MPEG decoding, decompression, or descrambling, is executed as needed to obtain content 182.

Through this process, encrypted content that is managed as a CPS unit stored on the information recording medium 170 is decoded so that the content can be used, i.e., so that the content can be played back.

2.3 Scheme of Management Based on Content Management Units (CPS Units) in a Case where Cross-playlist Editing is Allowed Next, a scheme of management based on content management units (CPS units) in a case where a virtual playlist is provided will be described with reference to FIG. 5 and subsequent figures.

Figure 5:
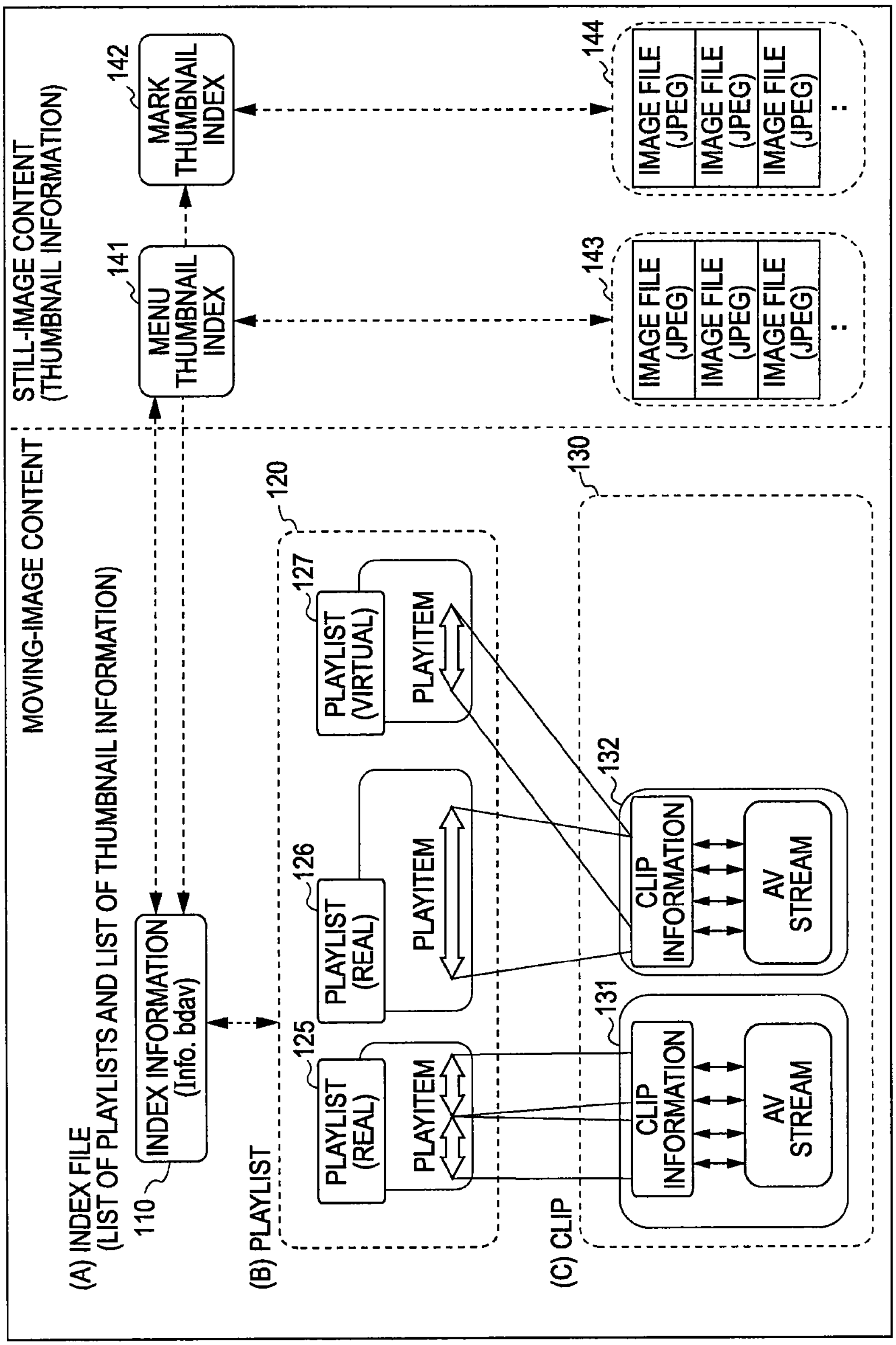
FIG. 5 is a diagram showing a recording format of data stored on an information recording medium, including a virtual playlist.

As shown in FIG. 5, two types of playlist exist. One is real playlists 125 and 126, and the other is a virtual playlist 127. The real playlists 125 and 126 are considered as sharing a clip stream portion they refer to. That is, the playlists 125 and 126 occupy a data volume in a disc corresponding to the clip stream portion they refer to. When an AV stream is recorded as a new clip, a real playlist that refers to the allowable playback range of the entire clip is automatically created. When a portion of the playback range of the real playlists 125 and 126 is deleted, data of a clip stream portion that the deleted portion refers to is also deleted. In contrast, the virtual playlist 127 is considered as not sharing clip data. Even when the virtual playlist 127 is modified or deleted, the clip does not change. That is, the virtual playlist 127 is a playlist that refers to a clip virtually, and can freely refer to an arbitrary clip.

Figure 6:
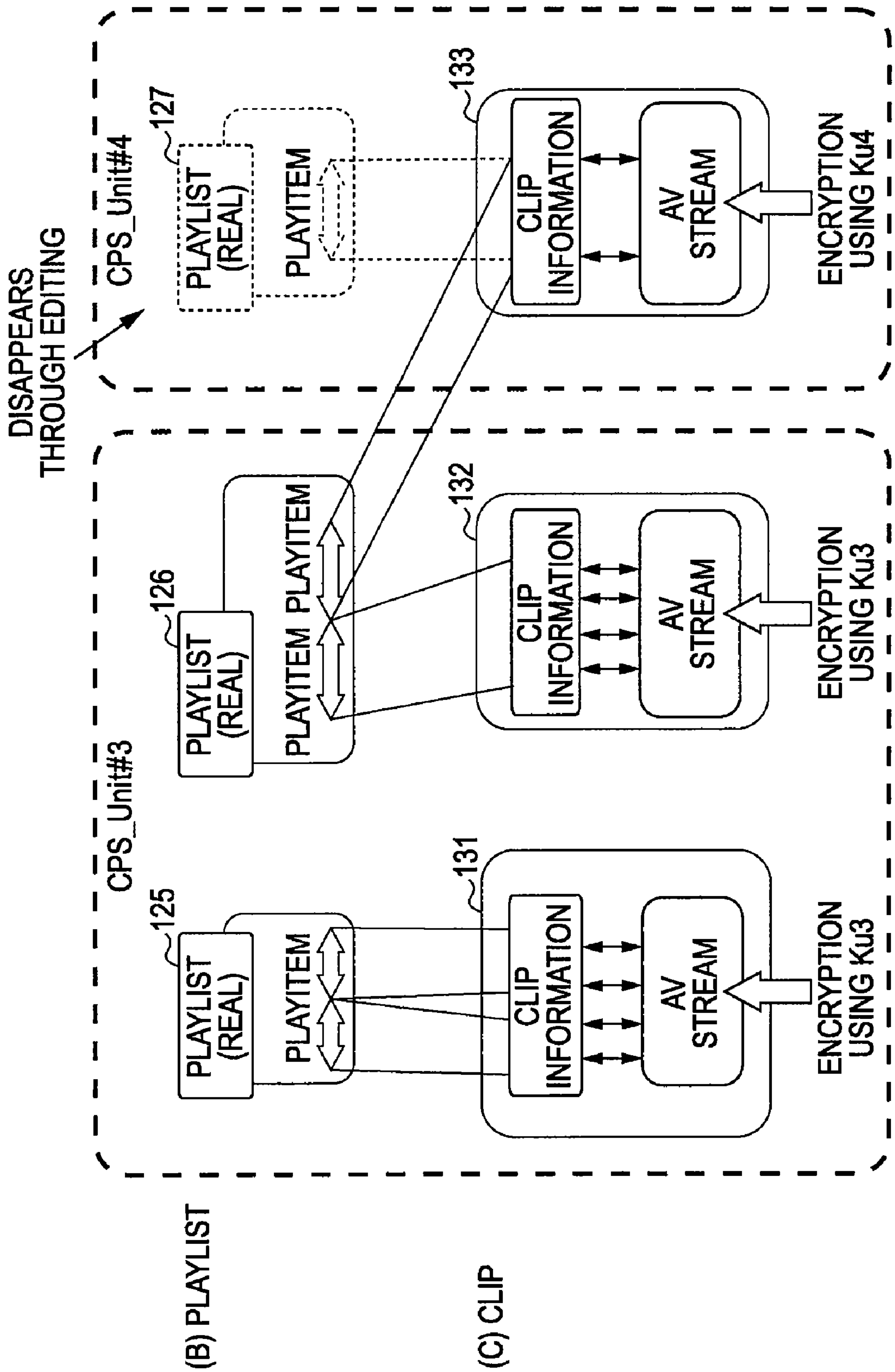
FIG. 6 is a diagram for explaining a problem in setting of content management units (CPS units) corresponding to data including a virtual playlist.

A playlist can refer to different clip stream files. However, when content management units (CPS units) described earlier with reference to FIG. 3 are set, some problems arise. As an example, FIG. 6 shows a result of a combination editing (combining two playlists into a single playlist) of the playlist 126 and the playlist 127 from the state shown in FIG. 3. Through the combination editing, the playlist 127 becomes absent, and a single CPS unit 3 including the real playlists 125 and 126 associated with moving-image content is set. However, since the real playlist 126 refers to a clip originally included in the CPS unit 4 as well as a clip included in the CPS unit 3, of a clip AV stream that is to be played back according to the playlist 126, it is not possible to specify an encryption key (Ku4) for the portion of the clip 133.

Figure 7:
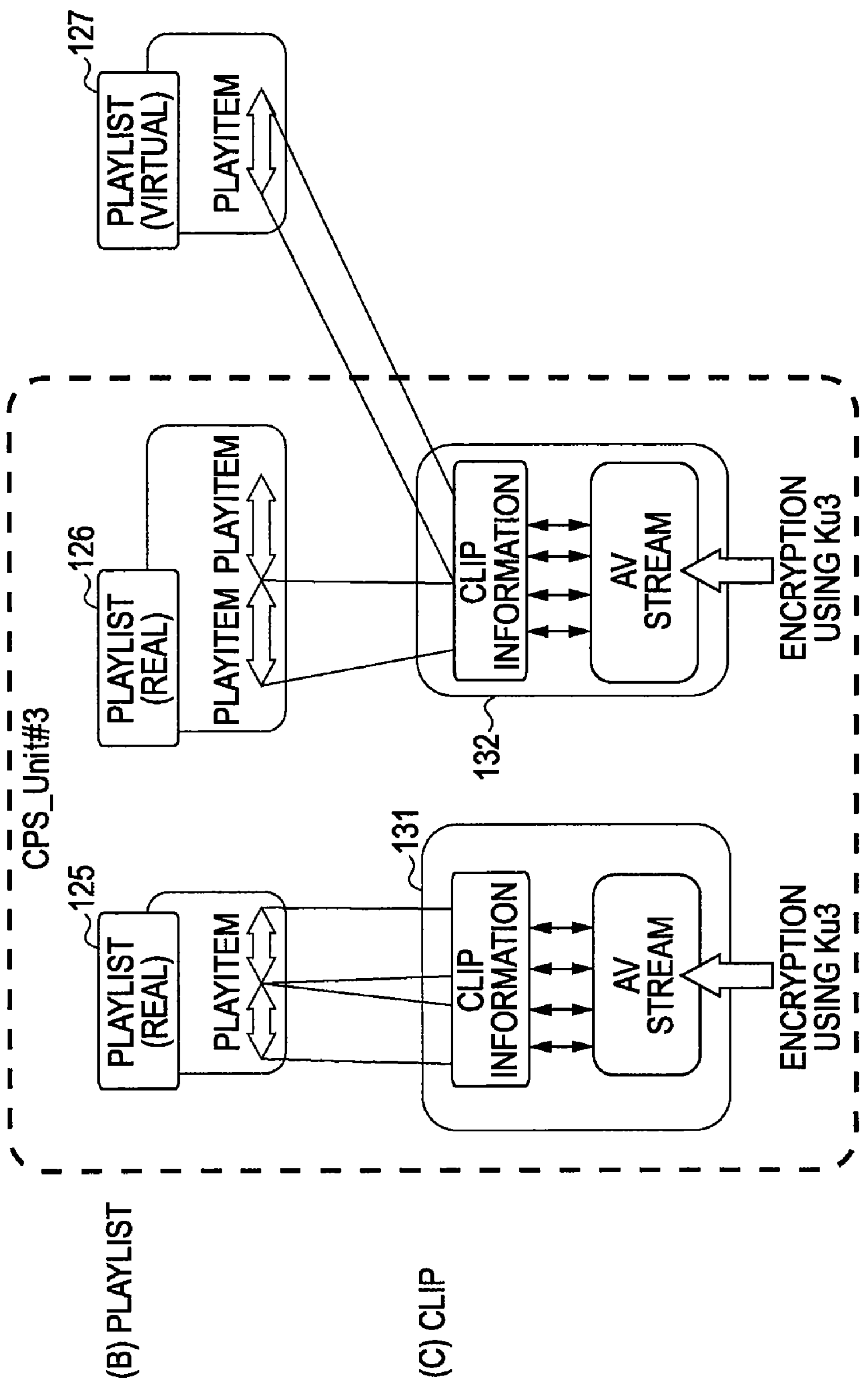
FIG. 7 is a diagram showing an example of setting of content management units (CPS units)

Now, an example scheme for solving this problem will be described. FIG. 7 shows an example scheme for solving this problem, in which content management units (CPS units) are set under the following condition.

Condition 1: Combination editing of real playlists is prohibited (i.e., reference to a clip belonging to different CPS units is prohibited).

The above condition dictates that a real playlist refers only to a clip set in a CPS unit that the real playlist belongs to. According to this scheme, CPS units can be assigned and CPS units can be recognized on the basis of a playlist without causing inconsistencies in editing operations. As for a virtual playlist, CPS units are not assigned, so that the flexibility of editing of the virtual playlist is enhanced.

Figure 8:
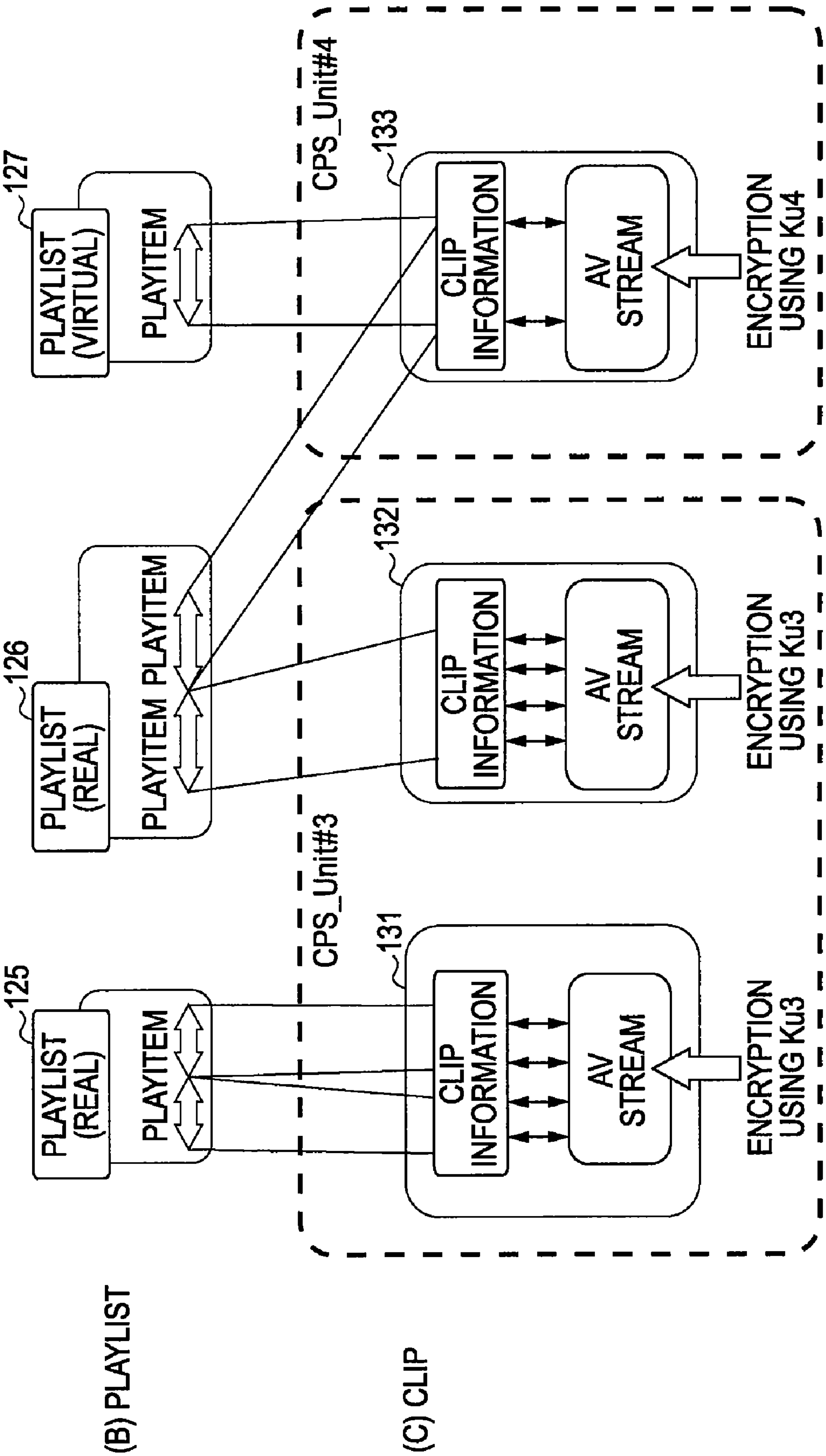
FIG. 8 is a diagram showing an example of setting of content management units (CPS units)

FIG. 8 shows an example scheme in which CPS units are set on a basis of clips. According to the scheme shown in FIG. 8, a CPS unit 3 includes clips 131 and 132, and a CPS unit 4 includes a clip 133. A playlist is defined as data not belonging to any CPS unit.

Since the playlist is independent of CPS units in the scheme described above, the association between CPS units and encrypted data is not affected in editing that is executed in the playlist layer, so that flexible editing is allowed.

Figure 9:
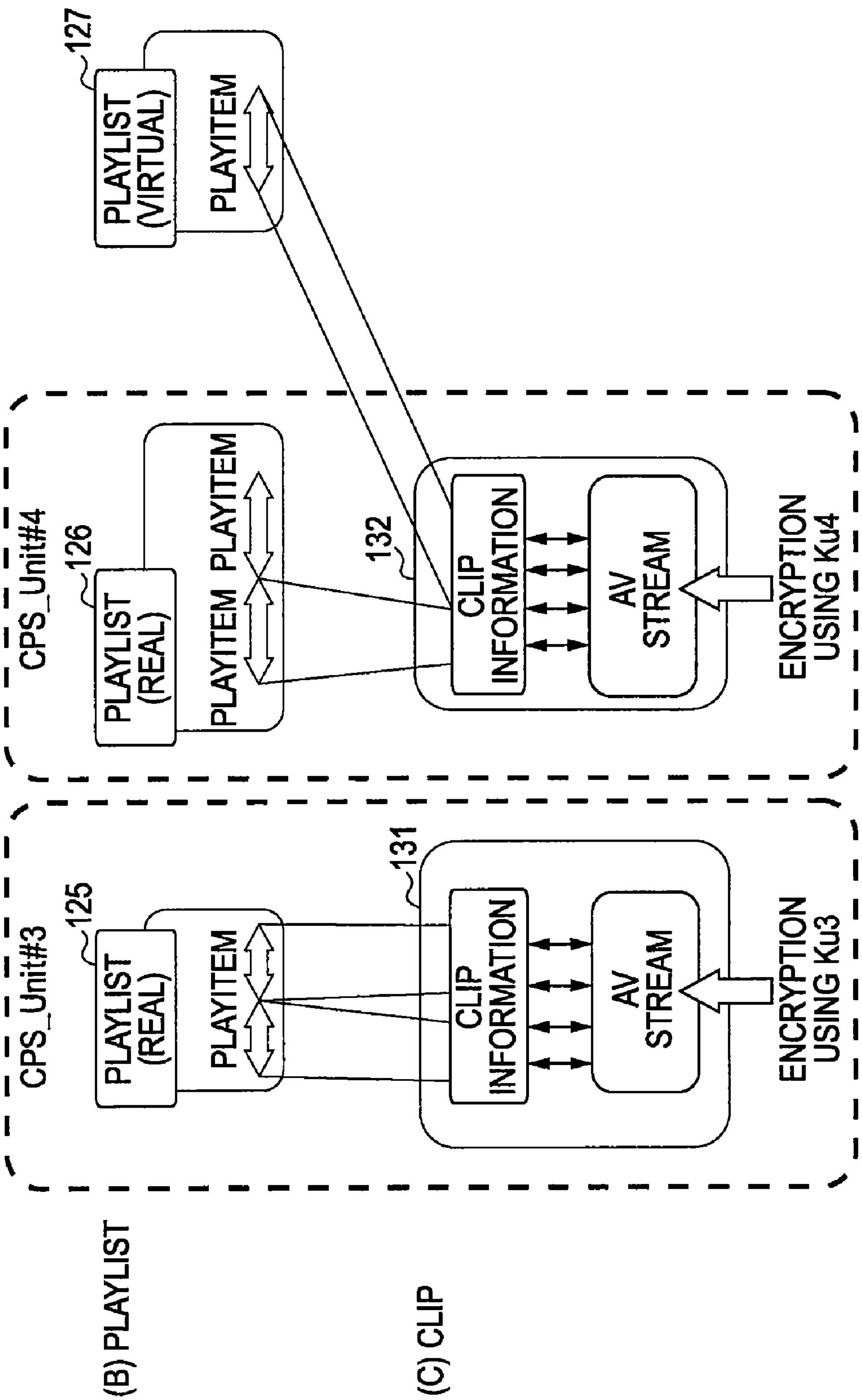
FIG. 9 is a diagram showing an example of setting of content management units (CPS units)

FIG. 9 shows an example scheme in which one CPS unit is assigned to one real playlist. In this case, one-to-one association between playlists and CPS units is ensured. Thus, complex description regarding association between playlists and CPS units is not needed in management information of the playlist. This management scheme is a simple scheme in which one unit key is set for each playlist.

Figure 10:
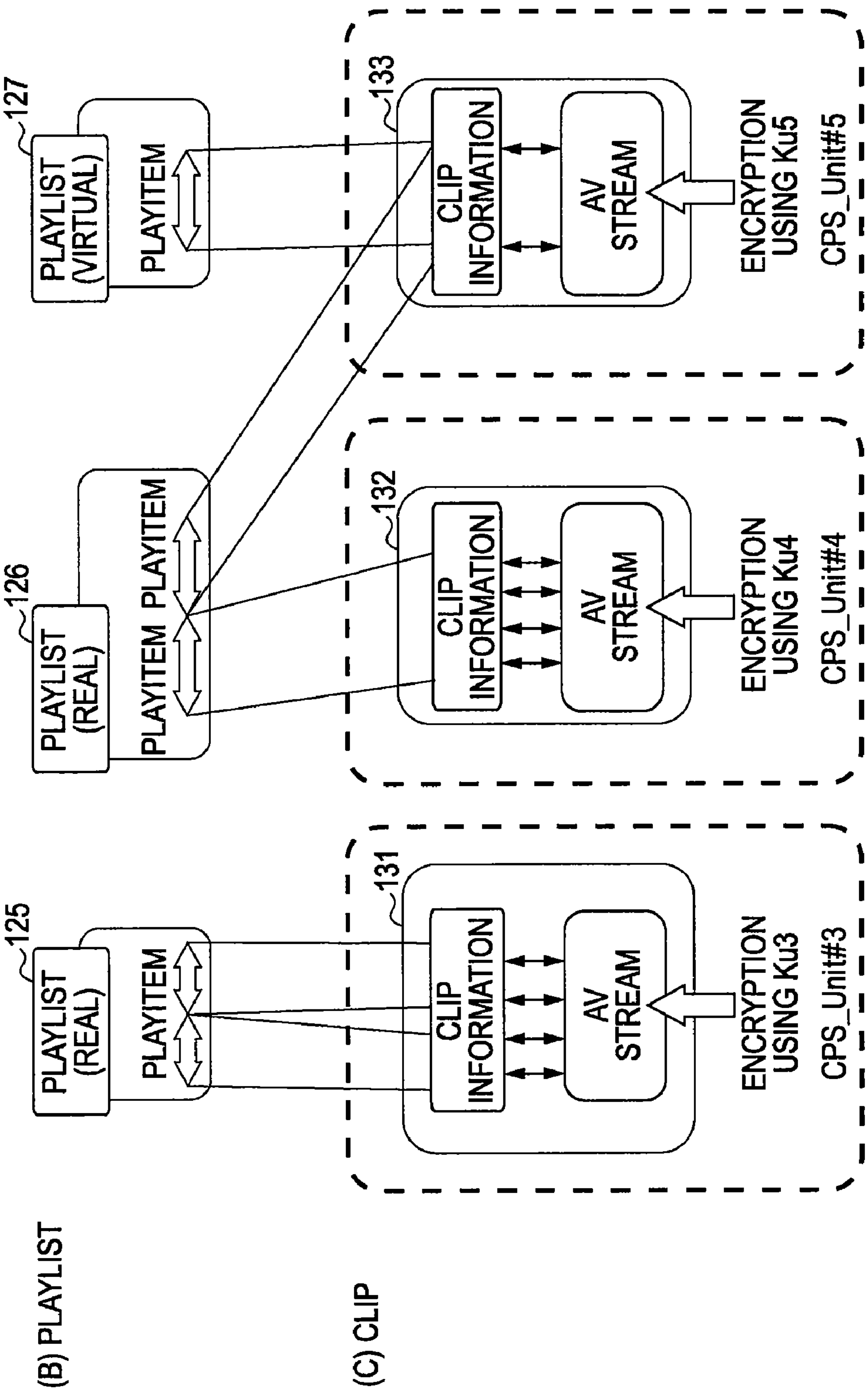
FIG. 10 is a diagram showing an example of setting of content management units (CPS units)

FIG. 10 shows an example scheme in which one CPS unit is assigned to one clip. In this case, one-to-one association between clips and CPS units is ensured. Thus, complex description regarding association between clips and CPS units is not needed in management information of the playlist. This management scheme is a simple scheme in which one unit key is set for each clip. Furthermore, in this case, it is possible to encrypt only an AV stream without encrypting clip information. In this case, management information such as playlists or clips are not encrypted, so that quick playback is allowed.

Figure 11:
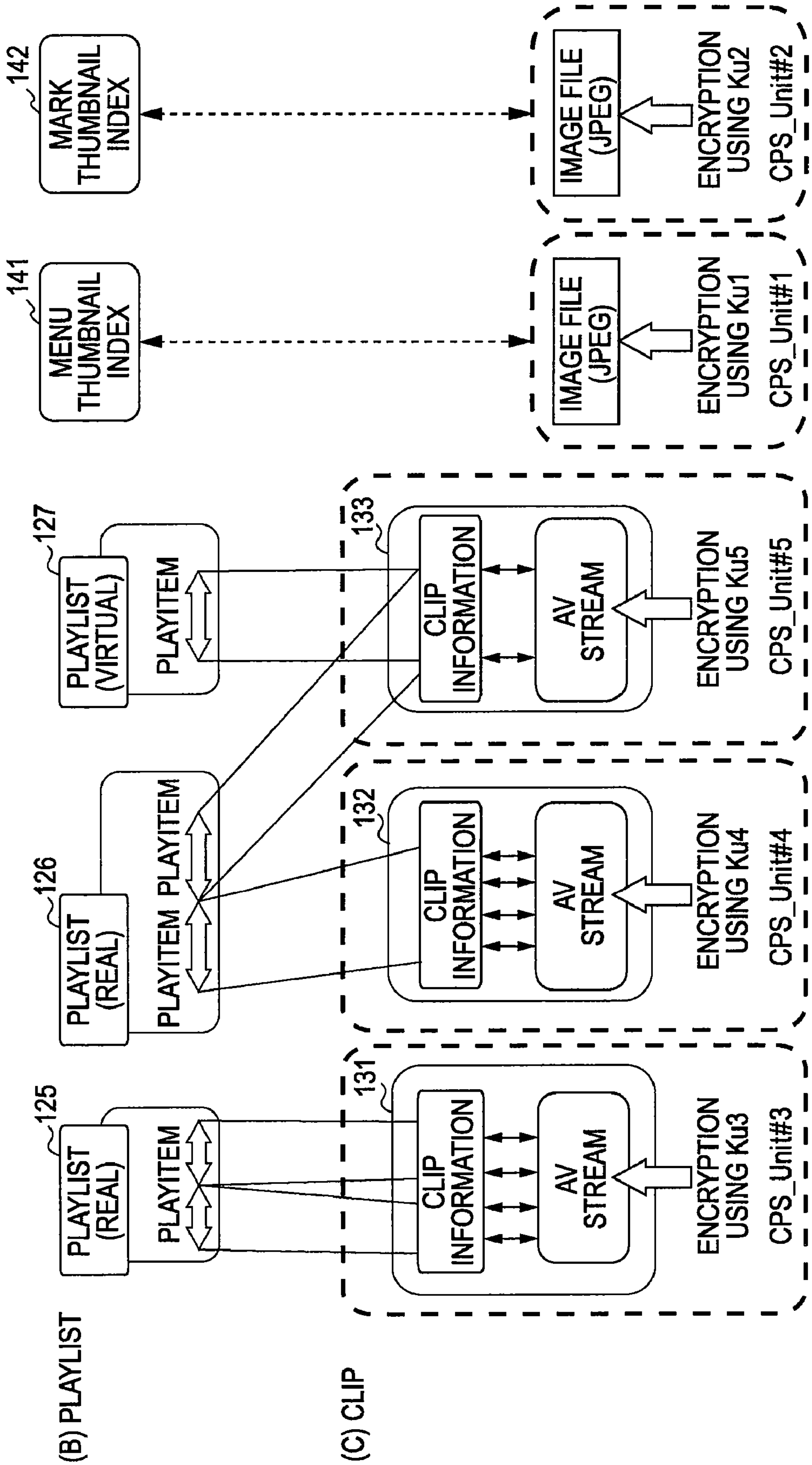
FIG. 11 is a diagram showing an example of setting of content management units (CPS units)

FIG. 11 shows an example scheme in which one CPS unit is assigned to one clip, similarly to the example scheme shown in FIG. 10. In the example scheme shown in FIG. 11, a CPS unit is also set in association with an image file of actual data of still-image content. Also in this case, one-to-one association between clips and CPS units is ensured, and complex description regarding association between clips and CPS units is not needed in management information of the playlist. This management scheme is a simple scheme in which one unit key is set for each clip.

3. Structure of Unit Key File

Next, a plurality of example structures of a unit key file storing a unit key [K_un] that is set in association with a content management unit (CPS unit) stored on an information recording medium will be described.

As described earlier, unit keys used for encryption of content are set individually for content management units (CPS units) stored on an information recording medium. The unit keys are stored in a unit key file in an encrypted form. FIGS. 12A and 12B show schemes of setting of CPS unit keys and an example of association of unit keys. FIG. 12 show units for setting of CPS units as units of usage management of encrypted content stored on an information recording medium, and association of CPS unit keys applied to individual CPS units.

As described earlier, the units for setting of CPS units can be defined in various ways. FIG. 12A shows an example of setting of a unit key file in a case where CPS units are set in association with playlists.

FIG. 12B shows an example of setting of unit keys in a case where CPS units are set in association with clips. This example is an example of setting of a unit key file associated with the schemes of setting of CPS units described earlier with reference to FIGS. 10 and 11.

FIGS. 12A and 12B show examples for explaining structures of a CPS unit key file. An example of data structure of an actual CPS unit key file will be described with reference to FIG. 13 and subsequent figures.

FIG. 13 is a diagram showing a syntax corresponding to an example of the structure of a CPS unit key file. As shown in FIG. 13, a CPS unit key file includes a unit key file header 201 storing header information, and a unit key block 202 storing encrypted data of unit keys. Before the unit key file header 201, a start address of the unit key block 202 (Unit_Key_Block_start_address) is set.

FIGS. 14A and 14B show details of the unit key file header 201 and the unit key block 202. FIG. 14A shows details of the unit key file header 201, and FIG. 14B shows a syntax representing details of the unit key block 202. The CPS unit key file shown in FIGS. 13 and 14A and 14B shows the structure of a CPS unit key file in a case where CPS units are set in association with clips, and it is an example of setting of a unit key file associated with the schemes of setting of CPS units described earlier with reference to FIGS. 10 and 11. Also, the CPS unit key file corresponds to the structure of a unit key file shown in FIG. 12B.

As shown in FIG. 14A, the header portion of a CPS unit key file includes the following items of data:

(1) Application type (Application_Type): Identification information of an application format (e.g., 1 in the case of a playback-only disc format (BDMV) and 2 in the case of a recording/playback disc format (BDAV)). A recording/playback disc allows recording in the format of a playback-only disc. In that case, the application type is recorded as the playback-only disc format (BDMV).

(2) Number of directories (Num_of BD_Directory): Number of directories (Always 1 in the case of a playback-only disc (BDMV) and 1 to 5 in the case of a recording/playback disc (BDAV)).

(3) CPS unit number for menu thumbnail #1 (CPS_Unit_number for Menu Thumbnail#I): CPS unit number for a menu thumbnail.

(4) CPS unit number for mark thumbnail #1 (CPS_Unit_number for Mark Thumbnail#I): CPS unit number for a mark thumbnail.

(5) Number of clips in directory I (Num of Clip#I): Number of clips set in a directory I.

(6) ID#J of a clip set in directory I (Clip_ID#J in Directory #I): ID of clip (5-digit decimal number corresponding to XXXXX of a file name XXXXX.clpi).

This data need not necessarily be set in the case of a playback-only disc (BDMV).

(7) CPS unit number associated with directory #I and title #J (CPS_Unit_number for Title#J in Directory #I): CPS unit number associated with a clip ID of a clip. The title is a logical unit for the user to recognize one playback group, and includes one or more clips.

These items of data are stored as header information. In the unit key file having the structure shown in FIGS. 13 and 14A and 14B, a CPS unit number is associated with each menu thumbnail, a CPS unit number is associated with each mark thumbnail, and a CPS unit number is associated with each clip in each directory.

The unit key block of the CPS unit key file shown in FIG. 14B includes the following items of data:

(1) Number of CPS units (Num_of_CPS_Unit): Number of CPS units on disc.

(2) MAC of usage control information (MAC of Usage Rules#I): MAC (Message Authentication Code) value as integrity checking data of usage control information (CCI) file data associated with a CPS unit.

(3) MAC of media ID (MAC of Media ID#I): MAC value as integrity checking data of media ID [MediaID (serial number of a recording disc)].

(4) Encrypted CPS unit key for each CPS (Encrypted CPS Unit Key for CPS Unit#I): Encrypted data of a unit key assigned to a CPS unit.

Between the BDMV format in the case where the information recording medium is a playback-only disc (BDMV) and the BDAV format in the case where the information recording medium is a recording/playback disc (BDAV), the directory structure used by an application that executes recording or playback of data differs. The structure of the CPS unit key file shown in FIGS. 13 and 14A and 14B can be used with either disc or by either application. The data structure of the CPS unit key file shown in FIGS. 13 and 14 is only an example, and the constituent data can be changed to a certain extent as needed. For example, as described earlier, in the unit key file header shown in FIG. 14A, (6) ID#J of a clip set in directory I (Clip_ID#J in Directory #I): ID of a clip (5-digit decimal number corresponding to XXXXX of a file name XXXXX-.clpi) need not necessarily be set in the case of a playback-only disc (BDMV).

Figure 15:
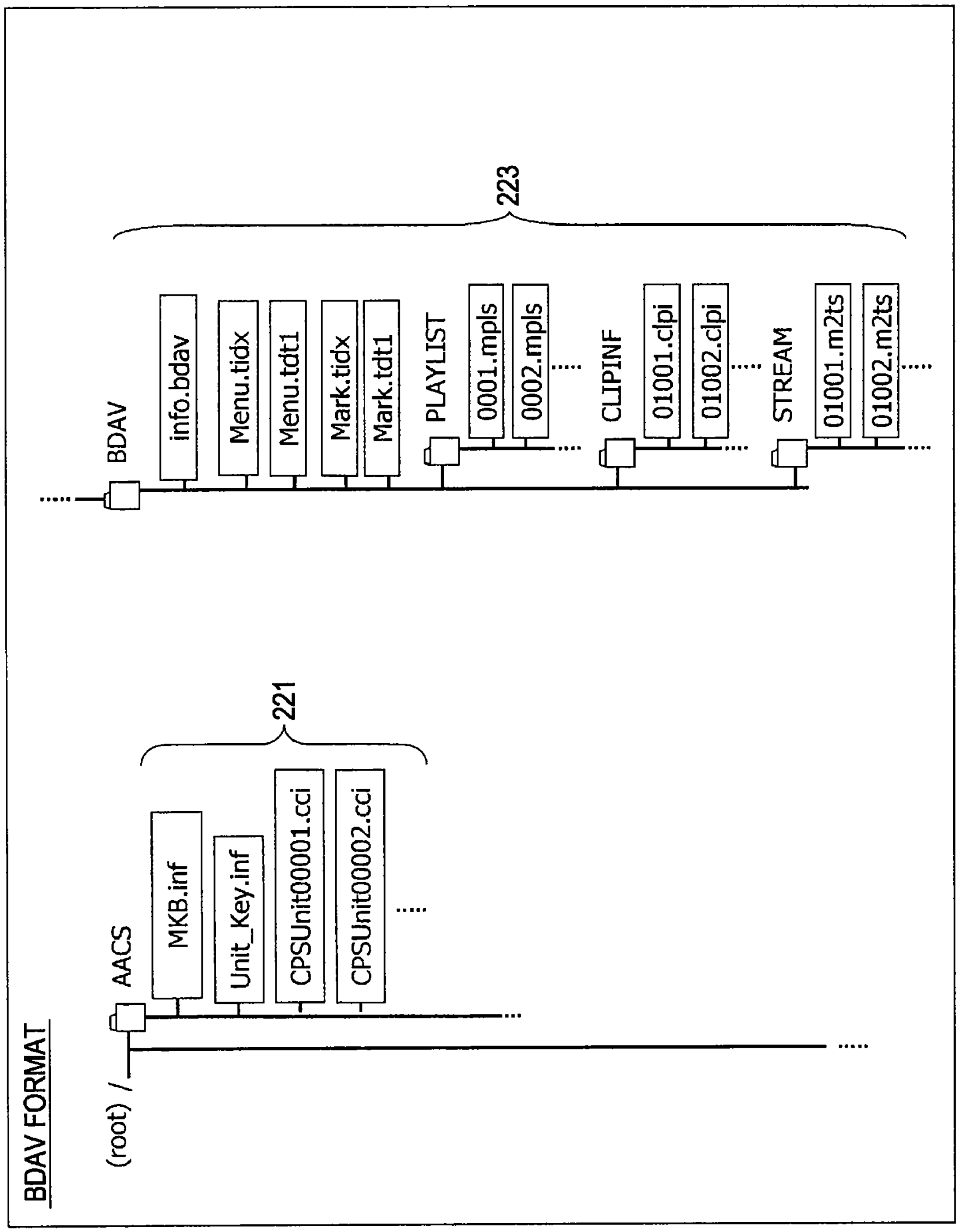
FIG. 15 is a diagram showing a directory structure corresponding to the BDAV format in a case where a recording and playback disc (BDAV) is used as an information recording medium.
Figure 16:
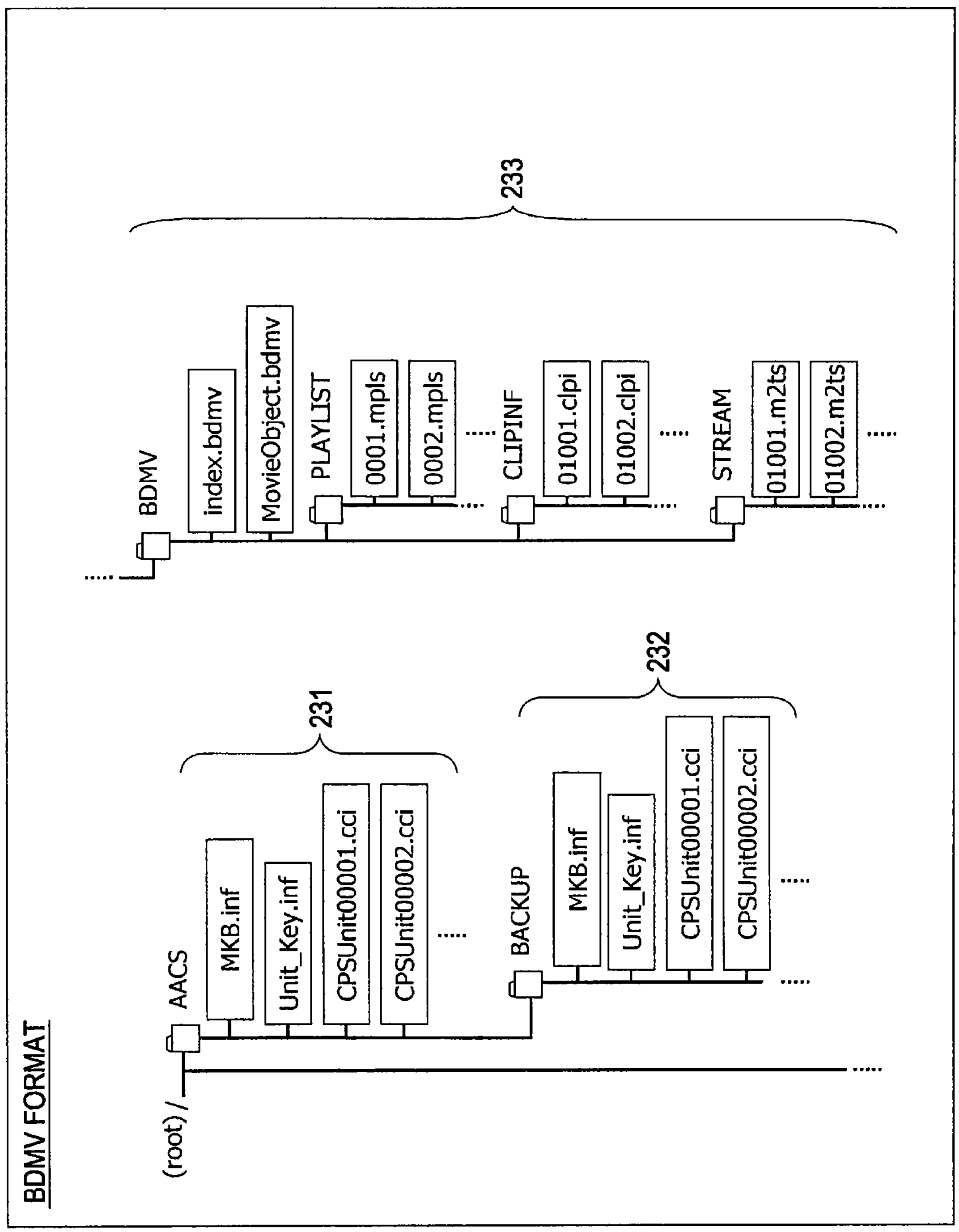
FIG. 16 is a diagram showing a directory structure corresponding to the BDMV format in a case where a playback-only disc (BDMV) is used as an information recording medium.

FIGS. 15 and 16 show a directory structure for the BDAV format in a case where an information recording medium is a recording/playback disc (BDAV) and a directory structure for the BDMV format in a case where an information recording medium is a playback-only disc (BDMV).

FIG. 15 shows a directory structure for the BDAV format. A data portion 221 is stores various types of additional information or control information, in which the MKB serving as an encryption key block described earlier, the unit key file described earlier, and content usage control information (CCI: Copy Control Information) associated with each CPS unit are set.

In a data portion 223, data according to the BDAV format is set, such as index information (info.bdav), menu thumbnails (Menu.tidx, Menu.tidx1) and mark thumbnails (Mark-.tidx, Mark.tidx1) constituting still-image content, playlists (0001.mpls, etc. in PLAYLIST), clips (01001.clpi, etc. in CLIPINF), and stream data files (01001.m2ts, etc. in STREAM) constituting moving-image content, described earlier with reference to FIG. 1.

FIG. 16 shows a directory structure for the BDMV format. A data portion 231 is stores various types of additional information and control information, in which the MKB serving as an encryption key block described earlier, the unit key file described earlier, and content usage control information (CCI: Copy Control Information) associated with each CPS unit are set.

In a data portion 232, a backup data file of data set in the data portion 231 is set. The backup data file is not necessary and is set as needed. In a data portion 233, data according to the BDMV format is set. In the BDAV format, a movie object (MovieObject) that serves as a program file is set. Furthermore, similarly to the BDAV format, playlists, clips, and stream data files constituting moving-image content are set.

The CPS unit key file described with reference to FIGS. 13 and 14 can be used either in both BDAV format and BDMV format shown in FIGS. 15 and 16, and the CPS unit key file can be used as a common key file for both formats.

An application that uses an information recording medium, executed by an information processing apparatus, checks with reference to the application type (Application_Type) of the header portion of the CPS unit key file shown in FIG. 14A whether the key file has a setting according to either BDMV or BDAV, and obtains a key that is to be used from the key block shown in FIG. 14B.

In the structure of the unit key file described with reference to FIGS. 13 and 14, as described earlier, each menu thumbnail is associated with a CPS unit number, each mark thumbnail is associated with a CPS unit number, and each clip (i.e., title) in each directory is associated with a CPS unit number.

For example, when an application program of an information processing apparatus that executes playback of content obtains a unit key that is used for decoding of content, a thumbnail or a clip as content to be played back is identified, a CPS unit number associated with the thumbnail or the clip is obtained from the CPS unit key file header shown in FIG. 14A, and a unit key associated with the CPS unit number is obtained from the CPS unit key block shown in FIG. 14B.

Next, various examples of setting of a unit key file will be described with reference to FIG. 17 and subsequent figures.

(1) First Example of Setting of CPS Units in Association with Playlists

FIG. 17 shows the structure of a unit key file in a case where CPS units are set in association with playlists. In the CPS unit key file shown in FIG. 17, CPS unit numbers associated with menu thumbnails, mark thumbnails, and playlists #1 to #np are recorded in a CPS unit key file header 301, and encrypted unit keys associated with the individual CPS unit numbers are stored in a CPS unit key block 302. This CPS unit key file can be used in association with the example of setting of CPS units described earlier with reference to FIGS. 3 and 7.

(2) Second Example of Setting of CPS Units in Association with Playlists

FIG. 18 also shows the structure of a unit key file in a case where CPS units are set in association with playlists. In the CPS unit key file shown in FIG. 18, in a CPS unit key file header 311, CPS unit numbers associated with menu thumbnails and mark thumbnails are recorded, and as for playlists, playlist IDs are directly written and CPS unit numbers associated with the individual playlist IDs are recorded. In a CPS unit key block 312, encrypted unit keys associated with the individual CPS unit numbers are stored. This CPS unit key file can also be used in association with the example of setting of CPS units described earlier with reference to FIGS. 3 and 7.

(3) First Example of Setting of CPS Units in Association with Clips

FIG. 19 shows the structure of a unit key file in a case where CPS units are set in association with clips. In the CPS unit key file shown in FIG. 19, CPS unit numbers associated with menu thumbnails, mark thumbnails, and clips #1 to #nc are recorded in a CPS unit key file header 321, and encrypted unit keys associated with the individual CPS unit numbers are stored in a CPS unit key block 322. This CPS unit key file can be used in association with the example setting descried earlier with reference to FIG. 8, where CPS units are set in association with clips.

(4) Second Example of Setting of CPS Units in Association with Clips

FIG. 20 also shows the structure of a unit key file in a case where CPS units are set in association with clips. In the CPS unit key file shown in FIG. 20, in a CPS unit key file header 331, CPS unit numbers associated with menu thumbnails and mark thumbnails are recorded, and as for clips, clip IDs are written directly and CPS unit numbers associated with the individual clip IDs are recorded. In a CPS unit key block 332, encrypted unit keys associated with individual CPS unit numbers are stored. This CPS unit key file can also be used in association with the example setting described earlier with reference to FIG. 8, where CPS units are set in association with clips.

(5) First Example of Setting One CPS Unit for One Playlist

FIG. 21 shows the structure of a unit key file in a case where CPS units are set in association with playlists. In the CPS unit key file shown in FIG. 21, header information representing CPS unit numbers associated with playlists is not included, and only a CPS unit key block 341 storing encrypted unit keys associated with menu thumbnails, mark thumbnails, and playlists #1 to #np is set. Since a CPS unit key is set in association with a single playlist, CPS unit numbers associated with individual playlists need not be recorded, so that the file structure is simplified. This CPS unit key file can be used in association with the example setting described earlier with reference to FIG. 9, where CPS units are set in association with playlists.

(6) Second Example of Setting One CPS Unit for One Playlist

FIG. 22 also shows the structure of a unit key file in a case where CPS units are set in association with playlists. In the CPS unit key file shown in FIG. 22, CPS unit numbers associated with playlists are not included, and only a CPS unit key block 351 storing encrypted unit keys associated with menu thumbnails, mark thumbnails, and playlist IDs is set. Since a CPS unit key is set in association with a single playlist, CPS unit numbers associated with individual playlists need not be recorded, so that the file structure is simplified. This CPS unit key file can also be used in association with the example setting described earlier with reference to FIG. 9, where CPS units are set in association with playlists.

(7) First Example of Setting One CPS Unit for One Clip

FIG. 23 shows the structure of a unit key file in a case where CPS units are set in association with clips. In the CPS unit key file shown in FIG. 23, header information representing CPS unit numbers associated with clips is not included, and only a CPS unit key block 361 storing encrypted unit keys associated with menu thumbnails, mark thumbnails, and clips #1 to #nc is set. Since a CPS unit key is set in association with a single clip, CPS unit numbers associated with individual clips need not be recorded, so that the file structure is simplified. This CPS unit key file can be used in association with the example setting described earlier with reference to FIG. 10, where CPS units are set in association with playlists.

(8) Second Example of Setting One CPS Unit for One Clip

FIG. 24 shows the structure of a unit key file where CPS units are set in association with clips. In the CPS unit key file shown in FIG. 24, header information representing CPS unit numbers associated with clips is not included, and only a CPS unit key block 371 storing encrypted unit keys associated with menu thumbnails, mark thumbnails, and clip IDs is set. Since a CPS unit key is set in association with a single clip, CPS unit numbers associated with individual clips need not be recorded, so that the file structure is simplified. This CPS unit key file can also be used in association with the example setting described earlier with reference to FIG. 10, where CPS units are set in association with playlists.

As described above, various schemes of CPS unit setting are possible, and CPS unit key files may have various structures in accordance with the setting of individual CPS units.

4. Scheme of Encryption of Unit Key File Using Bind Seed

Next, a scheme of encryption of a unit key file stored on an information recording medium will be described.

As described earlier, content is stored on an information recording medium in the form of data belonging to content management units (CPS units) and encrypted using CPS unit keys. CPS unit keys are also recorded on an information recording medium as encrypted key data in a CPS unit key file.

Figure 25:
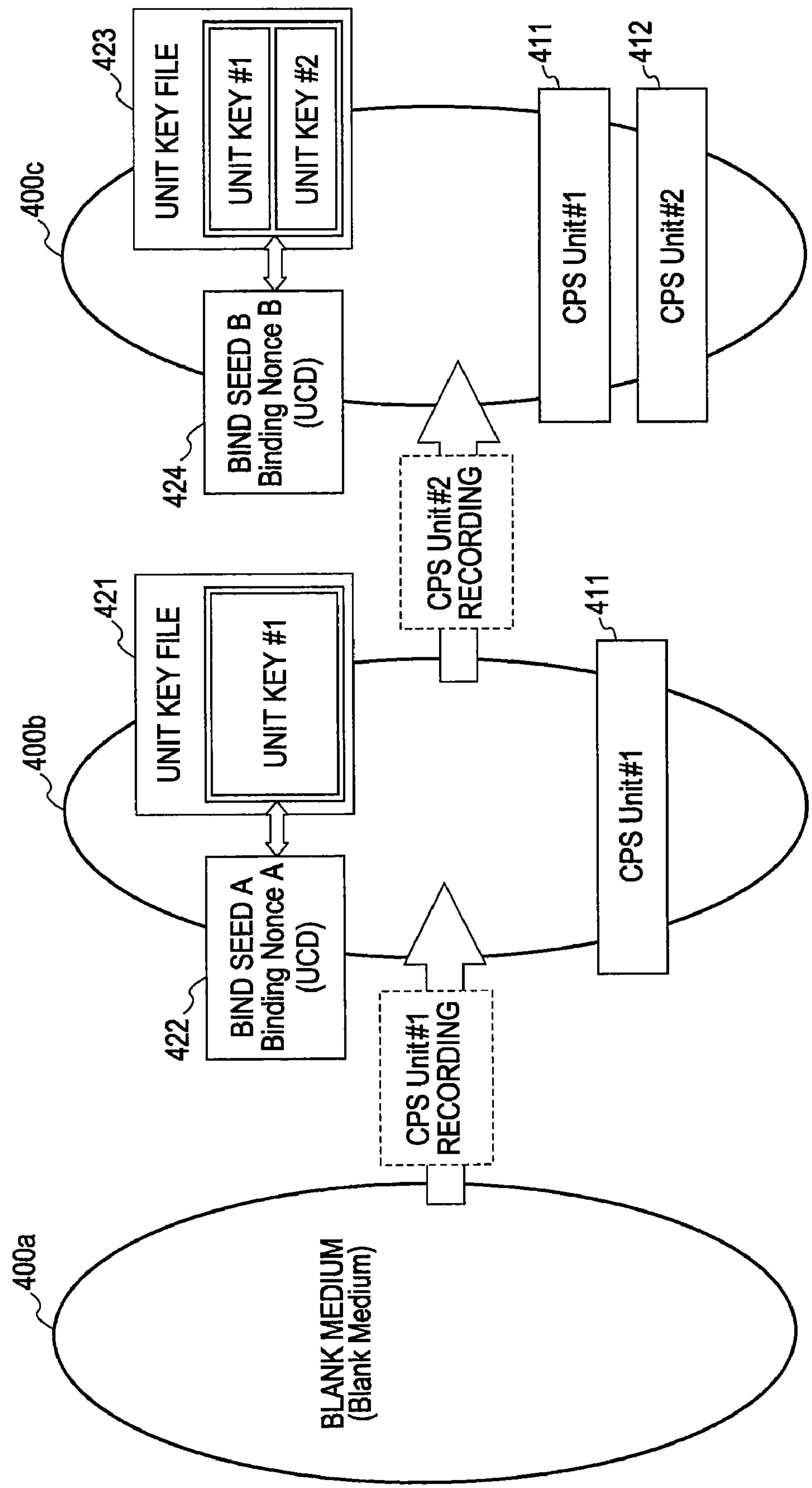
FIG. 25 is a diagram showing a scheme of encryption of a CPS unit key file.

A specific manner of encryption of a CPS unit key will be described with reference to drawings. FIG. 25 is a diagram for explaining change in CPS units and unit key files in a case where content is recorded in association with CPS units.

First, on an information recording medium 400*a*, which is a blank medium on which content associated with CPS units are not recorded, for example, a CPS unit #1,411 including an AV stream is recorded. The data included in the CPS unit #1,411, e.g., the AV stream included in a clip, is recorded in the form of data encrypted using a CPS unit key #1 that is set in association with the CPS unit #1,411. The CPS unit key #1 used for encryption is encrypted as a unit key file 421, and the unit key file 421 is recorded on an information recording medium 400*b*. The information recording media 400*a* to 400*c* are the same recording medium.

At this time, a bin key [Kb] is used as an encryption key for encrypting the CPS unit key file including the CPS unit key #1, and bind seed A 422 is used as encryption-key generating information applied to the bind key [Kb]. The bind seed A 422 is recorded in a user control data (UCD) area, as will be described later in detail. A process of generating the bind key [Kb] on the basis of the bind seed will be described later in detail. For example, the bind key [Kb] is generated by encrypting the bind seed using a media key [Km] obtained by processing of an encryption key block MKB using a device key [Km] possessed by an information processing apparatus, that is:

$$Kb=AES(Km, \text{bind seed})$$

AES(a, b) denotes data obtained by AES encryption of data b using a key a.

On the information recording medium 400*b* having recorded thereon the CPS unit #1,411, the unit key file 421 encrypted using the bind key [Kb] generated using the bind seed A 422 is recorded.

The bind seed is not fixed data, and is changed as needed in accordance with change in the constitution of the unit key stored in the unit key file. For example, as shown in FIG. 25, on the information recording medium 400*b* having recorded the CPS unit #1,411 thereon, a CPS unit #2,414 is further recorded (an information recording medium 400*c* shown in the figure). When the additional recording of a CPS unit is executed, a CPS unit file 423 is updated to include a CPS unit key #1 and a CPS unit key #2. On the occasion of updating, the bind seed is also changed. The bind seed is a statistically unique value that is generated on occasion of each updating and generation of a unit key file.

In the example shown in the figure, on the information recording medium 400*b* having recorded the CPS unit #1,411, the bind seed A 422 serves as information for generating bind key used for encryption of the unit key file 421. On the information recording medium 400*c* having recorded the CPS units #1,411 and #2,414, a bind seed B 424 serves as information for generating the bind key used for encryption of the unit key file 423.

Bind seed A≠Bind seed B

Thus, the bind key [Kb-a] that serves as an encryption key of the unit key file 421 including the CPS unit key #1 on the information recording medium 400*b* differs from the bind key [Kb-b] that serves as an encryption key of the unit key file 423 including the CPS unit key #1 and the CPS unit key #2 on the information recording medium 400*c*.

When content stored on the information recording medium 400*b* having recorded the CPS unit #1,411 thereon, i.e., encrypted content belonging to the CPS unit #1,411, is played back, it is needed to decrypt the unit key file 421. In this case, an encryption key (bind key [Kb-a]) is generated using the bind seed A 422, and the unit key file 421 is decrypted to obtain the unit key #1. Then, encrypted content included in the CPS unit #1,411 is decrypted using the unit key #1.

When content stored on the information recording medium having recorded the CPS unit #1,411 and the CPS unit #2,414 thereon, i.e., encrypted content belonging to the CPS unit #1,411 or the CPS unit #2,414 is played back, it is needed to obtain the CPS unit key #1 or the CPS unit key #2 from the unit key file 423. In this case, an encryption key (bind key [Kb-b]) is generated using the bind seed B 424, and the unit key file 423 is decrypted to obtain the unit key #1 or the unit key #2. Then, encrypted content included in the CPS unit #1,411 or the CPS unit #2 is decrypted using the unit key #1 or the unit key #2.

By changing the bind seed as needed in accordance with the constitution of unit key file, it is possible to strictly manage association between CPS units legitimately stored on an information recording medium and CPS unit keys that can be used.

Figure 26:
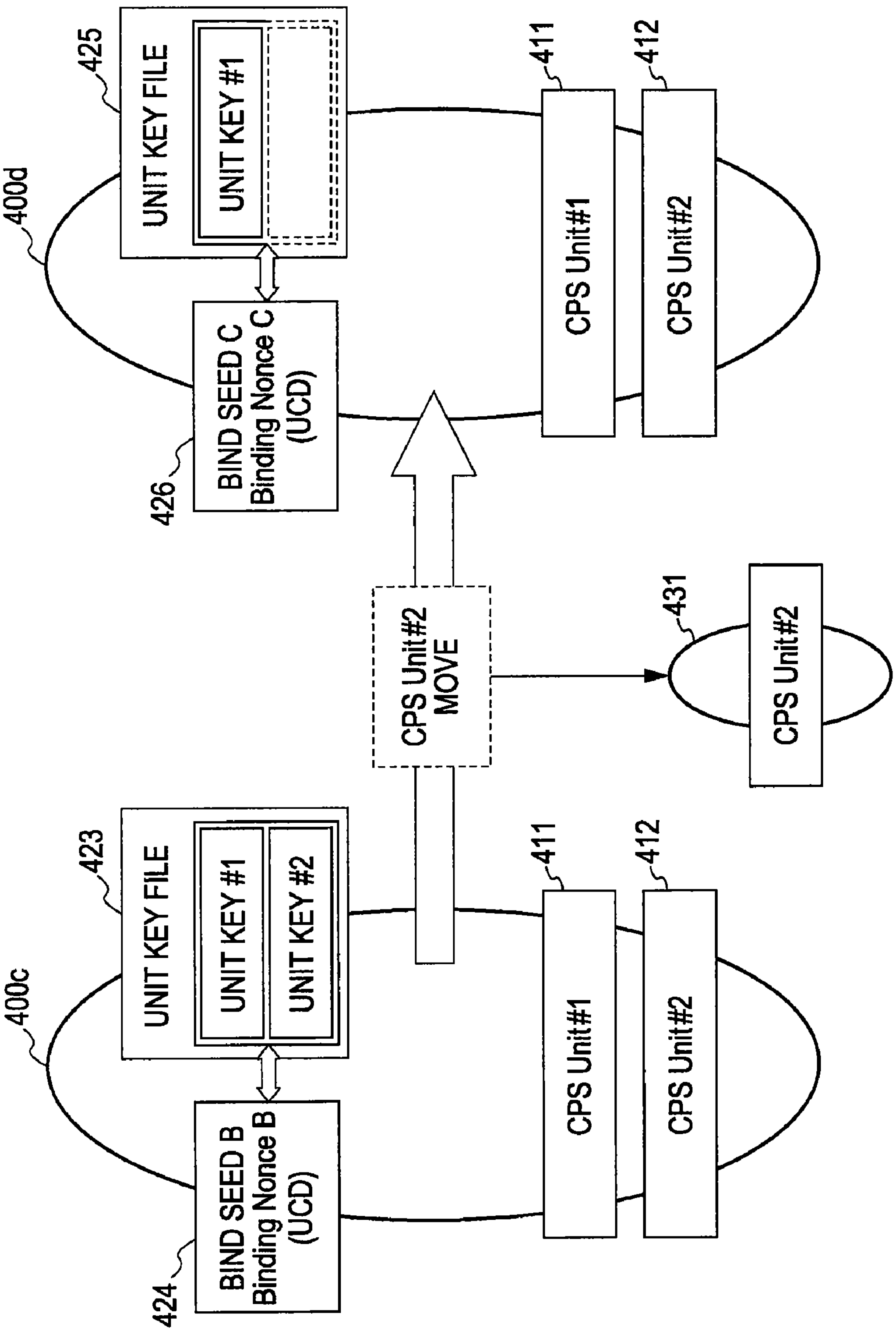
FIG. 26 is a diagram showing a scheme of encryption of a CPS unit key file.

An example of the scheme of strict management of CPS units and CPS unit keys will be described with reference to FIG. 26. FIG. 26 is a diagram for explaining a process of changing a bind seed in a case where a move operation of content (a CPS unit) from an information recording medium is executed. The move operation refers to an operation of moving content stored on an information recording medium to another medium or the like. In the example shown in the figure, the CPS unit #2,414 stored on the information recording medium 400*c* is moved to another information recording medium 431. In this move operation, the CPS unit #2,414 is recorded on an information recording medium 431 at a move destination. However, the CPS unit #2,414 on the information recording medium 400*c* at the move source is not deleted, and it is possible that the actual data remains and the CPS unit #2,412 physically remains on the information recording medium 400*c*.

In this case, an information processing apparatus and a drive apparatus that have executed a move operation with the information recording medium 400*c* mounted thereon updates the unit key file 423. When the unit key file is updated, the original bind seed B 424 is changed to generate a new bind seed C 426. Then, a unit key file 425 including the unit key #1 is encrypted using an encryption key (bind key [Kb-c]) that is generated using the bind seed C426, and the unit key file 425 storing the unit key #1 is recorded again on the information recording medium 404.

A specific sequence of a process executed by the information processing apparatus is described below.

Step 1

The unit key file 423 is decrypted using an encryption key B (bind key B) that is generated using the bind seed B 424, thereby obtaining the unit key #1.

Step 2

A new bind seed C 426 is generated, for example, by generating a random number.

Step 3

A new encryption key C (bind key C) is generated using the bind seed C generated, and the unit key file 425 including the unit key #1 is encrypted using the encryption key C (bind key C) generated and is recorded again on the information recording medium 404.

These steps are executed.

Through this process, the unit key files 423 and 425 recorded on the information recording medium 400*c* and the information recording medium 400*d* shown in FIG. 26 include bind keys generated using different bind seeds, i.e., the bind key [Kb-b] generated using the bind seed B424 and the bind key [Kb-c] generated using the bind seed C426, and file data encrypted using these different bind keys.

Although not shown in the figure, when the information recording medium 431 at the move destination of the CPS unit #2 is a recording medium of the same type as the information recording medium 400 at the move source or a recording medium having similar functions, a unit key file storing the CPS unit key #2 is recorded, and the unit key file storing the CPS unit key #2 is recorded on the information recording medium 431 as encrypted using an encryption key x (bind key x) that is generated using a unique bind seed x.

Accordingly, unit key files recorded on individual information recording media are encrypted using different encryption keys. Thus, even when a unit key file is copied between information recording media, it is not possible to obtain a correct associated bind seed, so that decryption of the copied key file is not allowed. Therefore, it becomes possible to strictly manage association between CPS units recorded on information recording media and unit keys recorded in CPS unit key files.

Figures 27A, 27B, 27C:
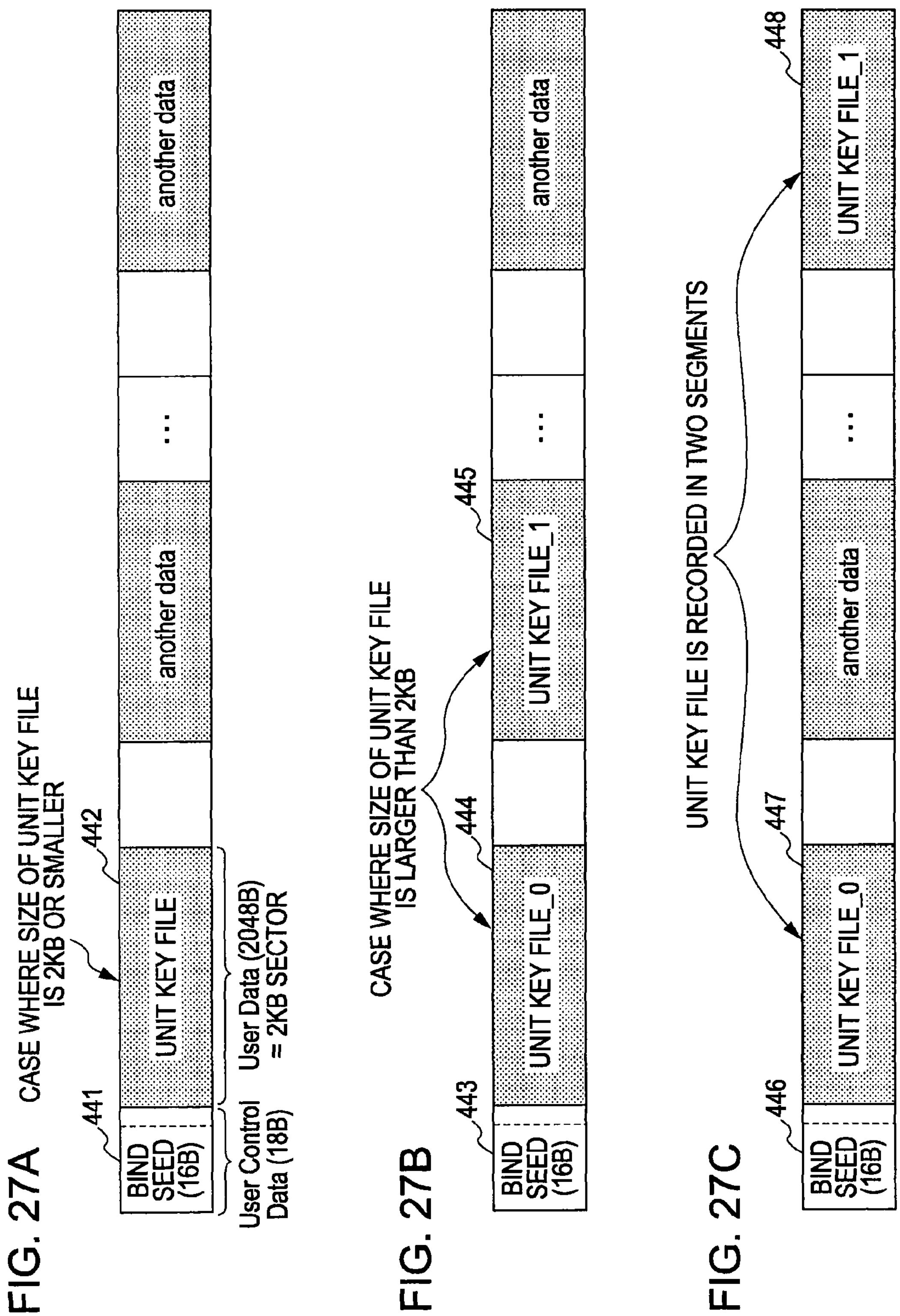
FIGS. 27A to 27C are diagrams showing schemes of recording of a bind seed and a CPS unit key file.

Next, examples of the structure of an area for recording a bind seed and a unit key file will be described with reference to FIGS. 27A to 27C. FIGS. 27A to 27C show three examples of the structure of recording.

Data recorded on an information recording medium includes 2048-byte user data (User Data) areas and 18-byte user control data (UCD: User Control Data) areas that are recorded alternately. A user control data area is an area for recording various types of control information. The user control data area is accessible only from a drive and is not directly accessible from an end user. The user data area is used as an area for recording various types of data files such as content.

The example shown in FIG. 27A is an example of recording a bind seed and a unit key file in a case where a unit key file is not larger than 2K (2048) bytes. In the example structure, a bind seed 441 is recorded using 16 bytes of an 18-byte UCD area, and a unit key file 442 is recorded in a 2-KB user data area following the UCD area in which the bind seed 441 is recorded.

The example shown in FIG. 27B is an example of recording a bind seed and a unit key file in a case where a unit key file is larger than 2K (2048) bytes. A bind seed 443 is recorded using 16 bytes of an 18-byte UCD area, and data segments of a unit key file are recorded as a unit key file_0,444 and a unit key file_1,445 in two 2-KB user data areas following the UCD area in which the bind seed 443 is recorded.

The example shown in FIG. 27C is an example of recording a bind seed and a unit key file in a case where the unit key file is larger than 2K (2048) bytes. A bind seed 446 is recorded using 16 bytes of an 18-byte UCD area, and data segments of a unit key file are recorded as a unit key file_0,447 and a unit key file_1,448 in two separate 2-KB user data areas subsequent to the UCD area in which the bind seed 446 is recorded.

As described above, a bind seed is recorded as data constituting user control data (UCD), and a unit key file is recorded using one or more 2-KB user data areas in accordance with the data length. By recording a bind seed separately from a unit key file in a user control area that is not directly accessible from a user, more strict content management can be achieved.

An example of the structure for recording data of a bind seed in a user control data (UCD) area will be described with reference to FIG. 28. FIG. 28 shows an 18-byte UCD area. The UCD area has a sequence of bytes 0 to 17 each allowing recording of 8 bits. In the UCD area, a 16-byte area of the byte sequence 0 to 15 is set as a bind-seed recording area.

When a unit key file recorded on an information recording medium is generated or updated, for example, bind seed data based on a random number is newly written in the 16-byte area or is updated. These processes are executed by a drive or an information processing apparatus with the information recording medium mounted thereon.

5. Recording and Reading of Unit Key File and Recording and Playback of Content Next, recording and reading of a unit key file and recording and playback of content will be described. First, processing sequences of a process of writing content associated with a CPS unit to an information recording medium and a process of playing back content associated with a CPS unit stored on an information recording medium will be described with reference to FIG. 29.

Figure 29:
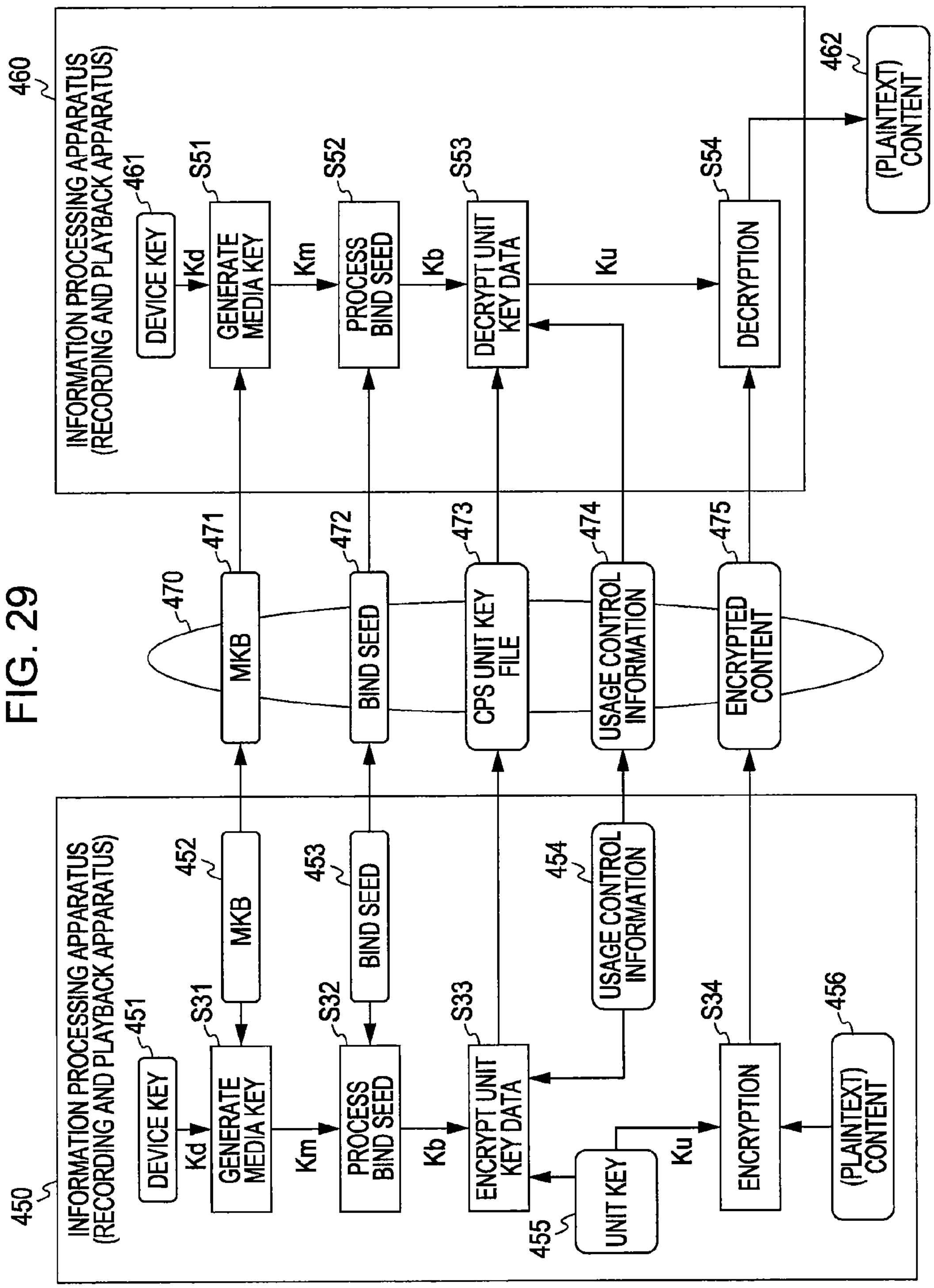
FIG. 29 is a diagram showing a sequence of encryption, recording, decryption, and playback of a unit key file and content.

In FIG. 29, an information processing apparatus 450 is shown as an apparatus that executes a process of recording content associated with a CPS unit on an information recording medium, and an information processing apparatus 460 is shown as an apparatus that execute a process of reading, decrypting, and playing back content associated with a CPS unit recorded on an information recording medium 470. The information processing apparatuses 450 and 460 may be the same apparatus.

First, the process of recording content associated with a CPS unit on the information recording medium 470 will be described in the context of a sequence on the side of the information processing apparatus 450. When a CPS unit is newly recorded on the information recording medium 470, first, in step S31, the information processing apparatus 450 obtains a device key 451 stored in a memory of the own apparatus, and obtains a media key by processing of an MKB that is an encryption-key block storing the media key.

As described earlier with reference to FIG. 4, the device key 451 is a secret key stored in an information processing apparatus that has received a license regarding use of content. An MKB (media key block) 452 is an encryption key block that is generated according to a tree-structure key distribution scheme that is known as a type of broadcast encryption scheme. The MKB 452 is a key information block that allows obtainment of a media key [Km] needed for decryption of content only through processing (decryption) based on a device key [Kd] stored on an information processing apparatus of a user having a valid license. This is an application of an information distribution scheme based on a hierarchical tree structure. The obtainment of a media key [Km] is allowed only when a user device (information processing apparatus) has a valid license, while an invalidated (revoked) user device is not allowed to obtain a media key [Km].

It is possible to read the MKB 471 recorded in advance on the information recording medium 470 and to use the MKB 471 as the MKB 452. Alternatively, the MKB 452 may be obtained, for example, from a medium such as other recording media or from a server via a network.

Then, in step S32, through bind-seed processing using a bind seed 453, for example, through AES encryption of a bind seed using the media key [Km], a bind key, i.e., an encryption key (bind key) for encrypting a CPS unit key, is generated. The bind seed 453 is generated at a drive, for example, by generating a random number. The sequence of a process executed between the drive and a host will be described later with reference to FIGS. 30 and 31. As described earlier with reference to FIGS. 27A to 27C and so forth, a bind seed 472 is recorded in a user control data area on the information recording medium 470.

Step S33 is a step of encrypting a unit key 455. The unit key 455 is a CPS unit key associated with a CPS unit to which content 456 to be recorded belongs, and is generated, for example, on the basis of a random number. The unit key 455 is encrypted using the encryption key generated on the basis of the bind seed in step S32. In this example, an encryption unit key is generated using usage control information (CCI) associated with a CPS unit. More specifically, as described earlier with reference to FIG. 4, for example,

[Enc(Kb, f(Ku_n, CCI))]

The encryption unit key is generated as encrypted data expressed by the above expression. The encryption key [Kb] is an encryption key generated on the basis of the bind seed. Enc(a, b) denotes encrypted data obtained by encrypting data b using a key a. f(a, b) denotes data representing the result of an operation based on data a and data b, such as the result of an exclusive-OR operation between a and b.

[Enc(Kb, f(Ku_n, CCI))] denotes, for example, data obtained by encrypting the result of an exclusive-OR operation between a unit key #n associated with a CPS unit #n and usage control information (CCI#n) associated with the CPS unit #n using the encryption key [Kb] generated on the basis of the bind seed. A CPS unit key file 473 storing an encrypted unit key generated as described above is recorded on the information recording medium 470. On the information recording medium, usage control information (CCI) 474 is also recorded.

When a unit key file including a plurality of unit keys is set, a single unit key file composed of data in which the individual unit keys are concatenated may be encrypted using a bind key, or a single unit key file composed of data in which the individual CPS unit keys and pieces of usage control information (CCI) may be encrypted using a bind key.

Furthermore, in step S34, the information processing apparatus 450 encrypts content 456 using the unit key 455. The content 456 is, for example, AV stream data included in a CPS unit. Encrypted content 475 obtained as a result of encryption in step S34 is recorded on the information recording medium 470. Encrypted content 476 indicated as data recorded on the information recording medium 470 corresponds to a CPS unit.

Next, a process of playing back content stored on the information recording medium 470 will be described in the context of a sequence on the side of the information processing apparatus 460. This process is basically the same as the process described earlier with reference to FIG. 4. In step S51, the information processing apparatus 460 decrypts the MKB 471 using the device key 461, the MKB 471 being an encryption key block storing the media key Km and stored on the information recording medium 470, thereby obtaining the media key Km.

Next, in step S52, an encryption key (bind key) Kb is generated through encryption based on the media key Km obtained by MKB processing in step S51 and a bind seed 472 read from the information recording medium 470. This key generation is executed, for example, according to the AES encryption algorithm.

Then, in step S53, a CPS unit key file 473 read from the information recording medium 470 is decrypted using the bind key Kb. The CPS unit key file 473 is a file storing encrypted data of unit keys [Kun] set in association with individual CPS units. As described earlier, the unit key file stores unit keys in the form of encrypted data having a structure of, for example, [Enc(Kb, f(Ku_n, CCI))]. A CPS unit key is obtained by decrypting the encrypted data using the bind key Kb and executing an operation based on the usage control information (CCI), such as an exclusive-OR operation.

That is, the following encryption unit key is decrypted using the bind key Kb:

[Enc(Kb, f(Ku_n, CCI))]

thereby obtaining data *[Kt]=f(Ku_n*, CCI)

Then, on the data [Kt]=f(Ku_n, CCI), an operation using the usage control information (CCI) 474 read from the information recording medium 470 is executed to obtain a unit key [Ku n]. When the data [Kt]=f(Ku_n, CCI) is the result of an exclusive-OR (XOR) operation between the unit key [Ku_n] and the usage control information [CCI], the unit key [Ku_n] can be obtained by executing an exclusive-OR (XOR) between the result of operation and the usage control information [CCI] read from the information recording medium.

Then, in step S54, decryption (e.g., AES_D) of the encrypted content 475 read from the information recording medium 470 is executed using the unit key [Ku_n] to obtain content 482.

FIG. 29 shows sequences of recording and playing back content associated with a CPS unit as a sequence executed by a single information processing apparatus. However, when content is recorded or played back by an information processing apparatus such as a PC having or connected to a drive apparatus that accesses an information recording medium, recording of a CPS unit key file or obtainment of a CPS unit key from the CPS unit key file is executed through data exchange between a host on the side of the information processing apparatus such as a PC and a drive that records or reads data to or from an information recording medium.

Sequences of processing between the host and the drive for executing a process of recording a CPS unit key file and a process of obtaining a CPS unit key from the CPS unit key file will be described with reference to FIGS. 30 and 31.

First, a sequence of processing executed between a host and a drive when a CPS unit key file is recorded on an information recording medium will be described with reference to FIG. 30. The processing sequence is executed, for example, when a new CPS unit key is added to an existing CPS unit key file or when a CPS unit key is deleted from a CPS unit key file as well as when a new CPS unit key file is recorded on an information recording medium. As described earlier, when a key stored in a CPS unit key file is updated and modified, in any case, a new bind seed is set, and the CPS unit key file is written on the information recording medium as encrypted using the new bind seed.

Figure 30:
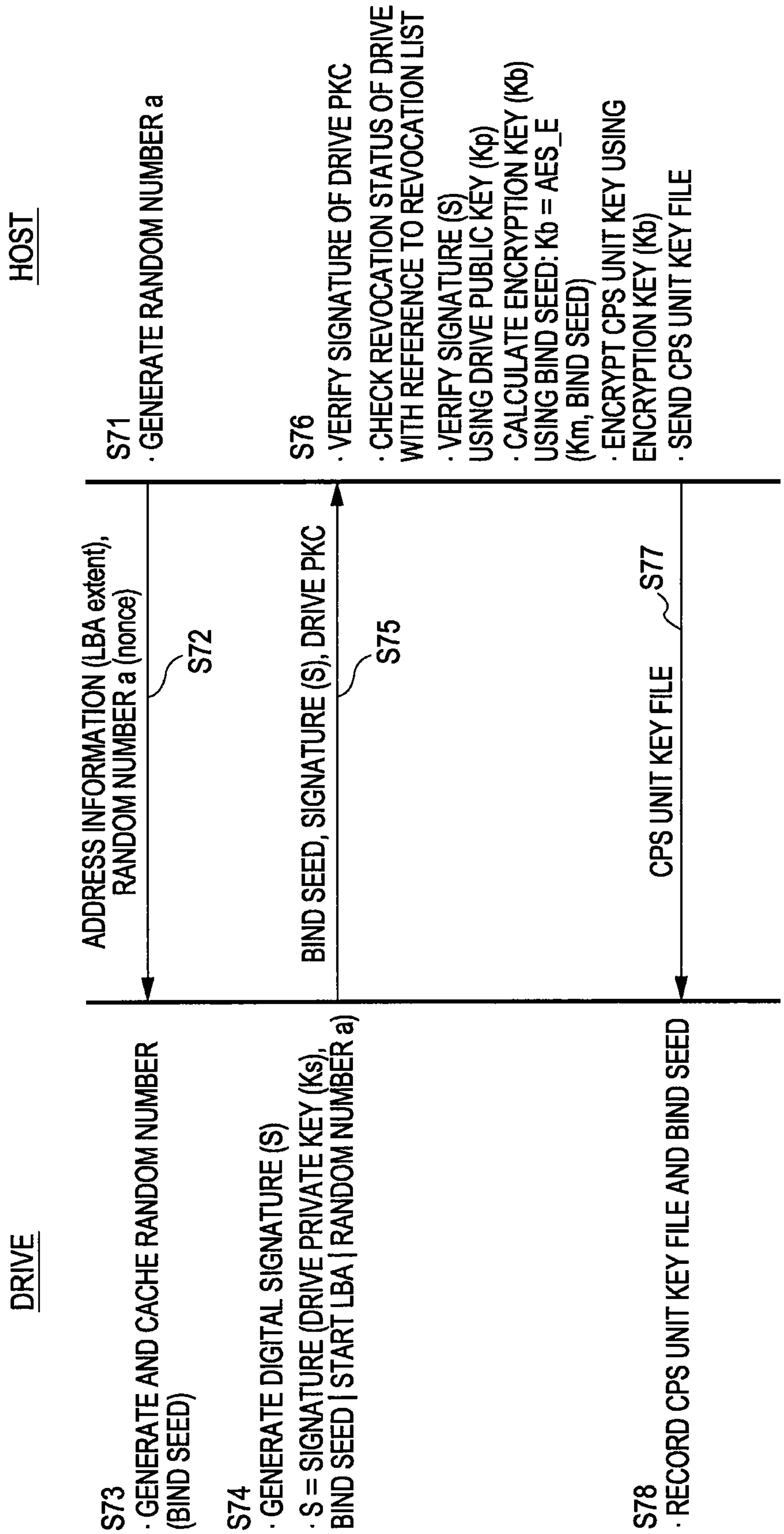
FIG. 30 is a sequence diagram showing the sequence of a process of recording a unit key file, executed between a host and a drive.

FIG. 30 shows a process executed by a host on the right side and a process executed by a drive on the left side. The drive has mounted thereon an information recording medium that allows writing information thereon. First, in step S71, the host generates a random number a. In step S72, the host sends a logical block address (LBA extent) information and the random number a generated (nonce) to the drive, the logical block address information indicating an area where a CPS unit key file is written.

In step S73, the drive generates a random number that is to be used as a new bind seed, and caches the random number in its own memory. Furthermore, in step S74, using a private key (Ks) of the drive, the drive digitally signs concatenated data including the [bind seed] generated, [start LBA], which is a start address of the logical block address (LBA extent) indicating an area where a CPS unit key file specified by the host is written, and [random number a] received from the host.

The digital signature (S) can be expressed as:

S=sign(drive private key (Ks), bind seed |start LBA| random number a)

sign(K, a|b|c) denotes data of a signature on concatenated data of data a, b, and c using a key [K].

In step S75, the drive sends the bind seed generated by the drive, the signature (S), and a public key certificate (PKC) of the drive to the host. In step S76, the host verifies the signature of the public key certificate (PKC) received from the drive to check the validity of the public key certificate (PKC), and checks the public key certificate against a revocation list associated with the PKC, i.e., a list of invalidated PKCs, thereby checking the validity of the public key certificate (PKC) of the drive, and the n obtains a public key (Kp) of the drive from the PKC.

Them the host verifies the signature (S) received from the drive using the public key (Kp) of the drive, i.e.:

S=sign(drive private key (Ks), bind seed |start LBA| random number a)

Then, the host generates an encryption key (bind key (Kb) used for encryption of a CPS unit key using the bind seed. The bind key (Kb) is, for example:

Kb=AES_E(Km, bind seed)

That is, the host generates the bind key (Kb) by AES encryption of the bind seed using the media key [Km]. The media key [Km] is key data that is obtained from an MKB by processing of the MKB on the basis of the device key [Kd] of the host, as described earlier with reference to FIG. 29. Since it suffices in this example to manage the bind key and the bind seed in association with each other, a value associating a bind seed and a bind key with each other may be used as a bind key.

Then, using the bind key (Kb), the host encrypts a CPS unit key file including a new CPS unit key generated on the basis of a random number or a CPS unit key file to be updated. When a CPS unit key file is updated, it is needed to obtain in advance a CPS unit key file already recorded on an information recording medium via a drive. This process is executed according to a process of reading a CPS unit key file, described with reference to FIG. 31. This process will be described later.

After generating a CPS unit key file encrypted using the bind key (Kb) generated using the new bind seed, in step S77, the host sends the CPS unit key file generated or updated to the drive.

In step S78, the drive records the CPS unit key file and the bind seed received from the host on an information recording medium. As described earlier with reference to FIGS. 27 and 28, the bind seed is written to a user control data (UCD) area, and the CPS unit key file is written to a user data area.

Next, a sequence of processing executed between the host and the drive when a CPS unit key is obtained from a CPS unit key file already recorded on an information recording medium will be described with reference to FIG. 31. This processing sequence is executed to obtain a CPS unit key when content associated with a CPS unit is played back. As described earlier, this process is also executed when a CPS unit key file is updated.

Figure 31:
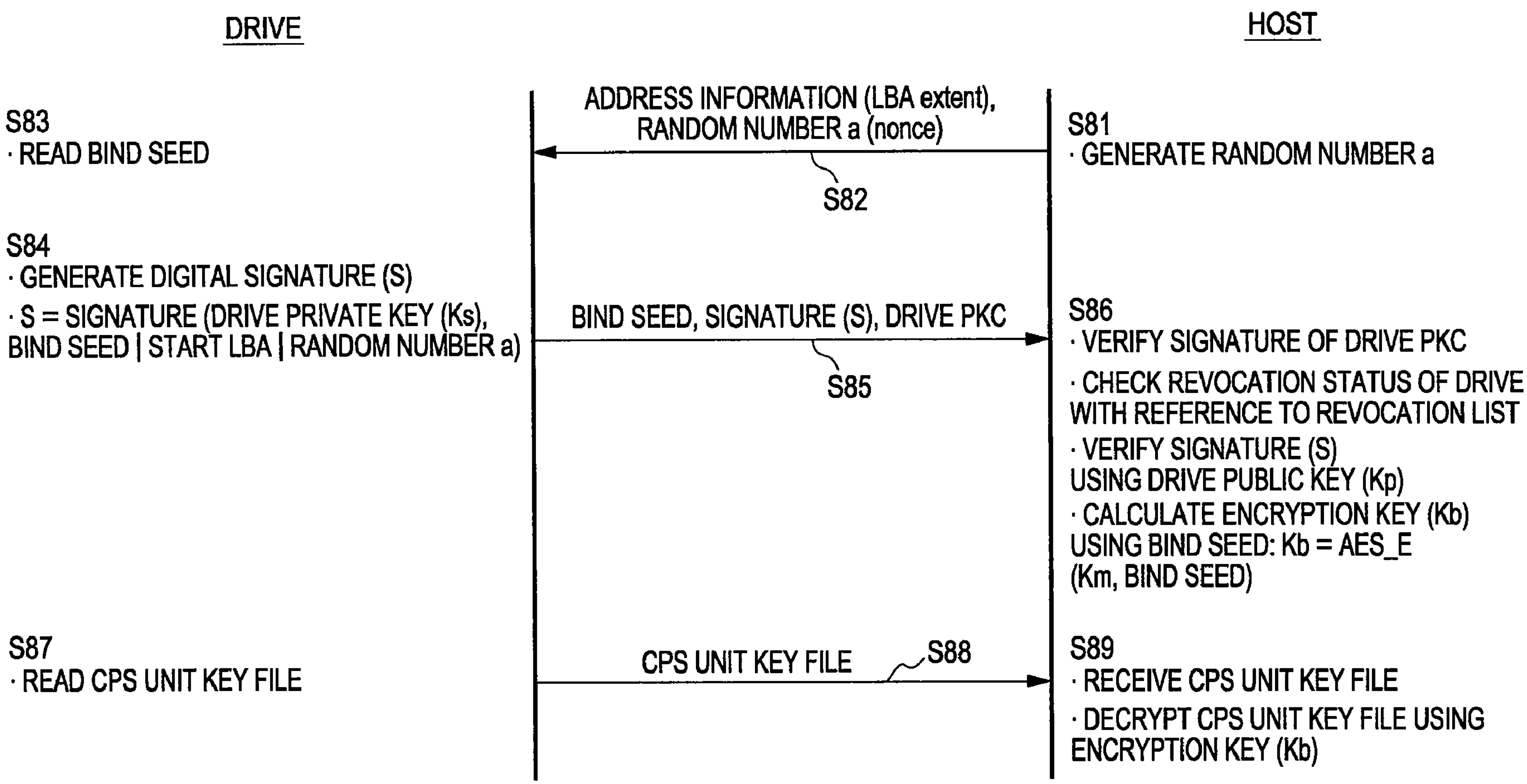
FIG. 31 is a sequence diagram showing the sequence of a process of reading a unit key file, executed between a host and a drive.

In FIG. 31, a process executed by the host is shown on the right side, and a process executed by the drive is shown on the left side. The drive has mounted thereon an information recording medium having a CPS unit key file recorded thereon. First, in step S81, the host generates a random number a. In step S82, the host sends logical block address (LBA extent) information and the random number a generated (nonce) to the drive, the logical block address information indicating an area where a CPS unit key file is written.

In step S83, the drive reads the bind seed from the information recording medium. Furthermore, in step S84, using the private key (Ks) of the drive, the drive digitally signs concatenated data including [bind seed] that has been read, [start LBA] representing a start address of the logical block address (LBA extent) indicating an area where the CPS unit key file specified by the host is written, and [random number a] received from the host. The digital signature (S) can be expressed as:

S=sign(drive private key (Ks), bind seed |start LBA| random number a)

In step S85, the drive sends the bind seed read by the drive from the information recording medium, the signature (S), and a public key certificate (PKC) of the drive to the host. In step S86, the host verifies the signature of the public key certificate received from the drive to check the validity of the public key certificate (PKC), and checks the public key certificate against a revocation list associated with the PKC, i.e., a list of invalidated PKCs, thereby checking the validity of the public key certificate (PKC) of the drive, and then obtains the public key (Kp) of the drive from the PKC.

Then, the host verifies the signature (S) received from the drive using the public key (Kp) of the drive, i.e.:

S=sign(drive private key (Ks), bind seed |start LBA| random number a)

Then, using the bind seed, the host generates an encryption key (bind key (Kb) used for decryption of a CPS unit key. The bind key (Kb) can be expressed, for example, as:

Kb=AES_E(Kmu, bind seed)

That is, the host generates the bind key (Kb) by AES encryption of the bind seed generated using the media key [Km]. The media key [Km] is key data that is obtained from an MKB through processing of the MKB on the basis of the device key [Kd] of the host, as described earlier with reference to FIG. 29.

Then, in step S87, the drive reads a CPS unit key file from an information recording medium. In step S88, the drive sends the CPS units key file to the host.

In step S89, the host receives the CPS unit key file from the drive, and decrypts the CPS unit key file using the bind key (kb) generated earlier to obtain a CPS unit key.

When encrypted content associated with a CPS unit is decrypted and played back, the CPS unit key obtained is used for decryption. When the CPS unit key file is updated, a new bind seed is generated and a CPS unit key is encrypted according to the sequence described earlier with reference to FIG. 30.

6. Structure for Recording Unit Key File on Information Recording Medium

Next, a structure for recording a unit key file on an information recording medium will be described. As described earlier, a unit key file is read when content is played back, and is also read and rewritten when a unit key in the file is added or deleted. That is, reading and writing occur more frequently compared with other data.

Reading of data from and writing of data to an information recording medium is executed by units of ECC block. An ECC block is, for example, a 64K-byte block including an 18-byte user control data and a plurality of 2 KB user data areas as described earlier with reference to FIGS. 27A to 27C. The ECC block has a predetermined error correcting code assigned thereto. After reading by units of ECC block, error correction is executed on the basis of the error correcting code, and data needed is then obtained from the ECC block. Also when data is updated or written, it is needed to calculate an error correcting code on the basis of constituent data of a new ECC block and to record the error correcting code.

Since this process is executed on a basis of individual ECC block, for example, when the number of ECC blocks needed for reading or writing of data of a specific file increases, or when a plurality of ECC blocks is to be read or written and the blocks exist at physically separate locations, the time taken to read or write the file increases. Furthermore, since the size of an ECC block is, for example, 64 KB while the size of a sector, which is the smallest unit for writing of a file, is 2 KB, writing of data only to a certain sector in an ECC block could occur. In this case, the drive once reads information of all the sectors recorded in the ECC block, changes information of certain sectors relevant to a write instruction from the host to values to be written, and records information again to the ECC block. This partial rewriting of an ECC block is referred to as RMW (read modify write). The RMW operation is likely to occur in a case where a plurality of files is recorded in a single ECC block. For example, when a unit key file having a size of 2 KB and another file (file A) are recorded in a single ECC block, an RMW operation occurs either in updating of the unit key file or updating of the file A.

Figure 32:
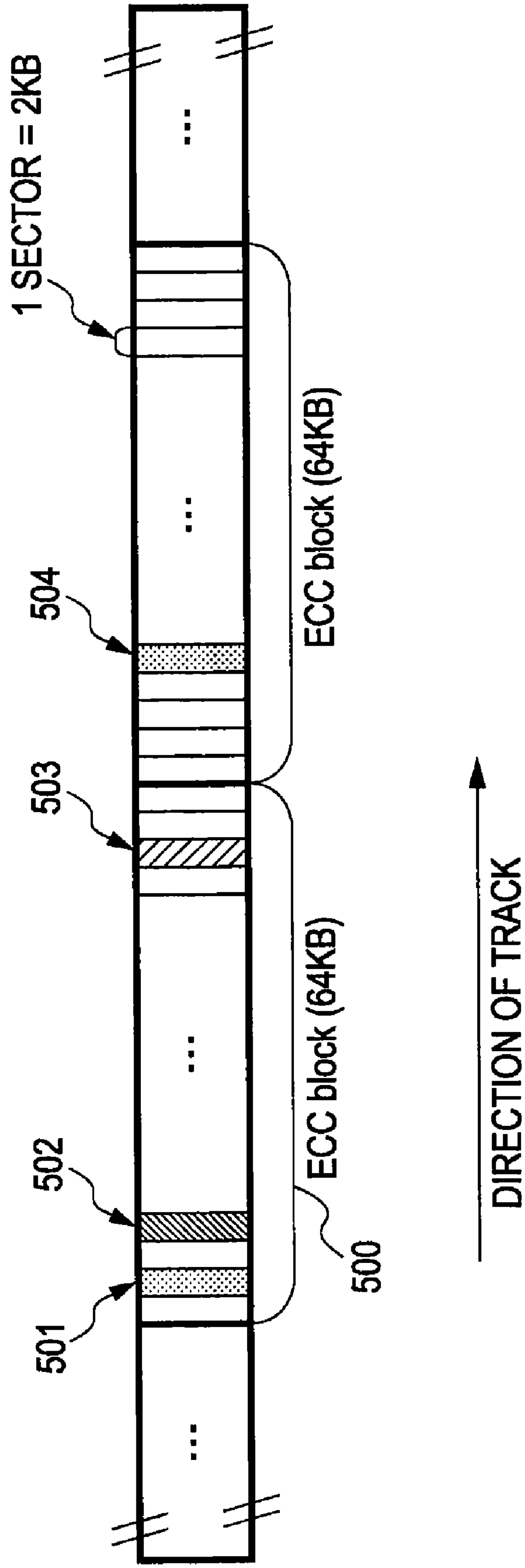
FIG. 32 is a diagram showing an example scheme for recording a unit key file.

A data accessing process in a data reading or writing process in an ordinary content playback or recording process will be described with reference to FIG. 32. FIG. 32 shows a structure for recording data along a direction of track on an information recording medium (disc).

Data is recorded by units of 64-KB ECC block along the direction of track. A 64-KB ECC block is a set of 2-KB sector data. In this data recording area, a CPS unit key file 501 in which CPS unit keys associated with CPS units are recorded in the form of encrypted data, a database file 502 storing a list of titles, such as index information, and title information of content associated with CPS units, and ordinary files 503 such as AV streams associated with CPS units are recorded. When a CPS unit key file exceeds 2 KB, the CPS unit key file is recorded in segments as a unit key file 504.

In the example shown in FIG. 32, a CPS unit key file is recorded in segments in a plurality of different ECC blocks. In this recording structure, when content is played back or when the CPS unit key file is updated, rewriting of a plurality of ECC blocks must be executed a plurality of times. When a CPS unit key file for which frequent access is predicted is divided in segments in a plurality of ECC blocks, processing time increases. Also, when the database file 202 or the ordinary files 503 are updated, the RMW operation described above occurs, so that the entire ECC blocks in which the CPS unit key file is recorded are rewritten on the recording medium. The frequency of rewriting of the database file 502 is high as well as that of the CPS unit key file. The frequency of rewriting of the ordinary files 503 depends on the applications of the files, and the ordinary files 503 can be rewritten very frequently in some cases. Thus, when the database file 502 or the ordinary files 503 are recorded in an ECC block where the CPS unit key file is recorded, compared with a case where only a CPS unit key file is recorded in an ECC block, the frequency of rewriting of the ECC block is higher. In an optical disk recording medium with a limitation of the number of times of physical rewriting, the possibility of degradation of the error correcting capability in the ECC block or loss of data due to occurrence of errors increases.

Figure 33:
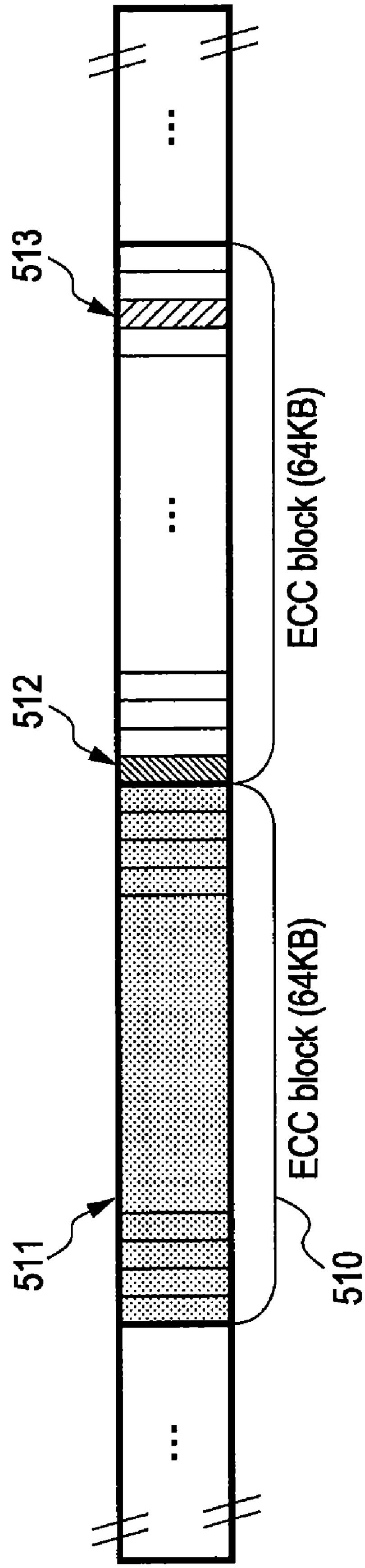
FIG. 33 is a diagram showing an example scheme for recording a unit key file, in which an area for recording a unit key file is set using ECC blocks as units.

Thus, an area for recording a CPS unit key file is allocated by units of ECC block, as shown in FIG. 33. In this embodiment, an ECC block is 64 KB, which is a sufficient data recording area for writing a CPS unit key file in view of the amount of data. However, two or more ECC blocks may be allocated as an area for recording a CPS unit key file when the amount of data of the CPS unit key file increases.

In the structure shown in FIG. 33, the entirety of a single ECC block 510 is allocated as an area for writing a CPS unit key file 511. In the structure shown in FIG. 33, the CPS unit key file 511 includes a bind seed described earlier. More specifically, the ECC block includes a plurality of user control data (UCD) and user data areas described earlier with reference to FIGS. 27A to 27C, a bind seed is recorded in a part of user control data (UCD) constituting the ECC block 510 selected as an area for writing the CPS unit key file 511, and the CPS unit key file is recorded in a part of a user data area constituting the ECC block 510.

A database file 512 and ordinary files 513 are written in ECC blocks other than the ECC block 510 set as an area for writing the CPS unit key file 511.

According to this structure, as long as the size of the CPS unit key file 511 is not larger than 64 KB, reading or updating of the CPS unit key file completes only by rewriting of a single ECC block. This serves to reduce processing time and to thereby improve efficiency. Furthermore, an RMW operation in an ECC block in which a CPS unit key file is recorded does not occur due to writing or updating of files other than the CPS unit key file. Thus, the possibility of degradation of the error correcting capability of the ECC block or loss of unit key data due to occurrence of write errors can be reduced.

Figure 34A:
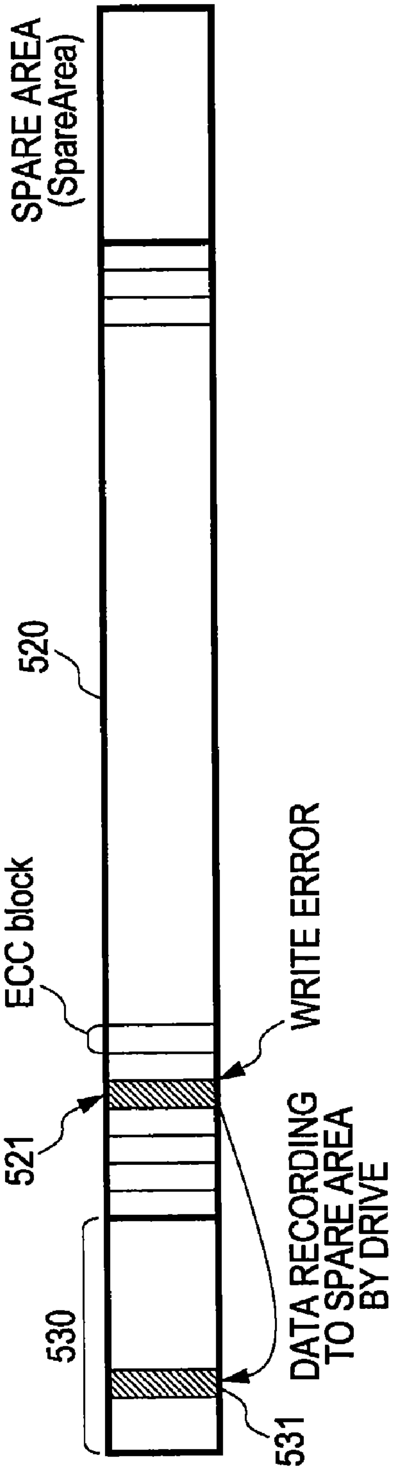
FIGS. 34A and 34B are diagrams for explaining a problem that occurs in relation to a write error of a unit key file.

Next, a scheme for preventing a situation where reading or writing of data is prohibited by occurrence of a defect in an area for writing a CPS unit key file due to frequent access to the CPS unit key file or the possibility of illegitimate use of remaining old CPS unit key file data written to a spare area on occasion of an error will be described with reference to FIGS. 34A and 34B and FIG. 35.

First, an ordinary process of writing to a spare area on occasion of a write error will be described with reference to FIGS. 34A and 34B. FIGS. 34A and 34B show (1) first write error and (2) second write error. As indicated by a data structure of (1) first write error shown in FIG. 34A, a data recording area of an information recording medium includes a user area 520 for executing ordinary reading and writing of data and a spare area 530. The spare area 530 is used as an alternative area for an error ECC block when an error occurs on occasion of writing of data to the user area and data writing fails.

For example, when the ECC block set as an area for writing the CPS unit key file becomes an error block, an alternative ECC block 531 is set in the spare area 530, and data of the CPS unit key file is written to the alternative ECC block 531.

Figure 34B:
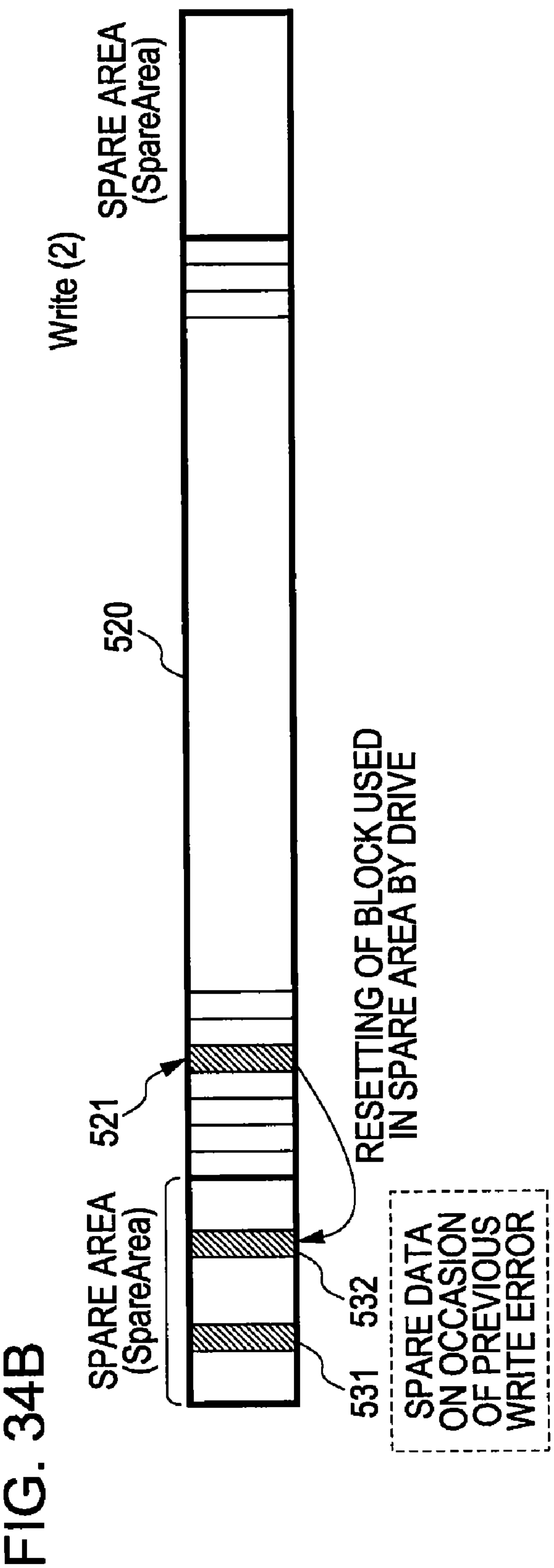

Next, as indicated by (2) second write error shown in FIG. 34B, when a write error occurs again in the ECC block 521 set in the user area 520 as an area for writing the CPS unit key file, an alternative ECC block 532 is further set from an unused area of the spare area 530, and data of the CPS unit key file is written to the alternative ECC block 532.

It is expected that the ECC block 521 set as an area for writing the CPS unit key file is frequently accessed and that the error rate increases as the number of times of writing or reading increases. As a result, a situation could occur where CPS unit key files of a plurality of generations remain recorded in the spare area 530.

A scheme for preventing occurrence of such a situation will be described with reference to FIG. 35. According to the scheme of data recording shown in FIG. 35, writing of a CPS unit key file to the same area more than a predetermined number of times is prohibited, and when the number of times of data writing or access to the same ECC block reaches the predetermined number of times, another ECC block is set as an area for writing the CPS unit key file.

Figure 35:
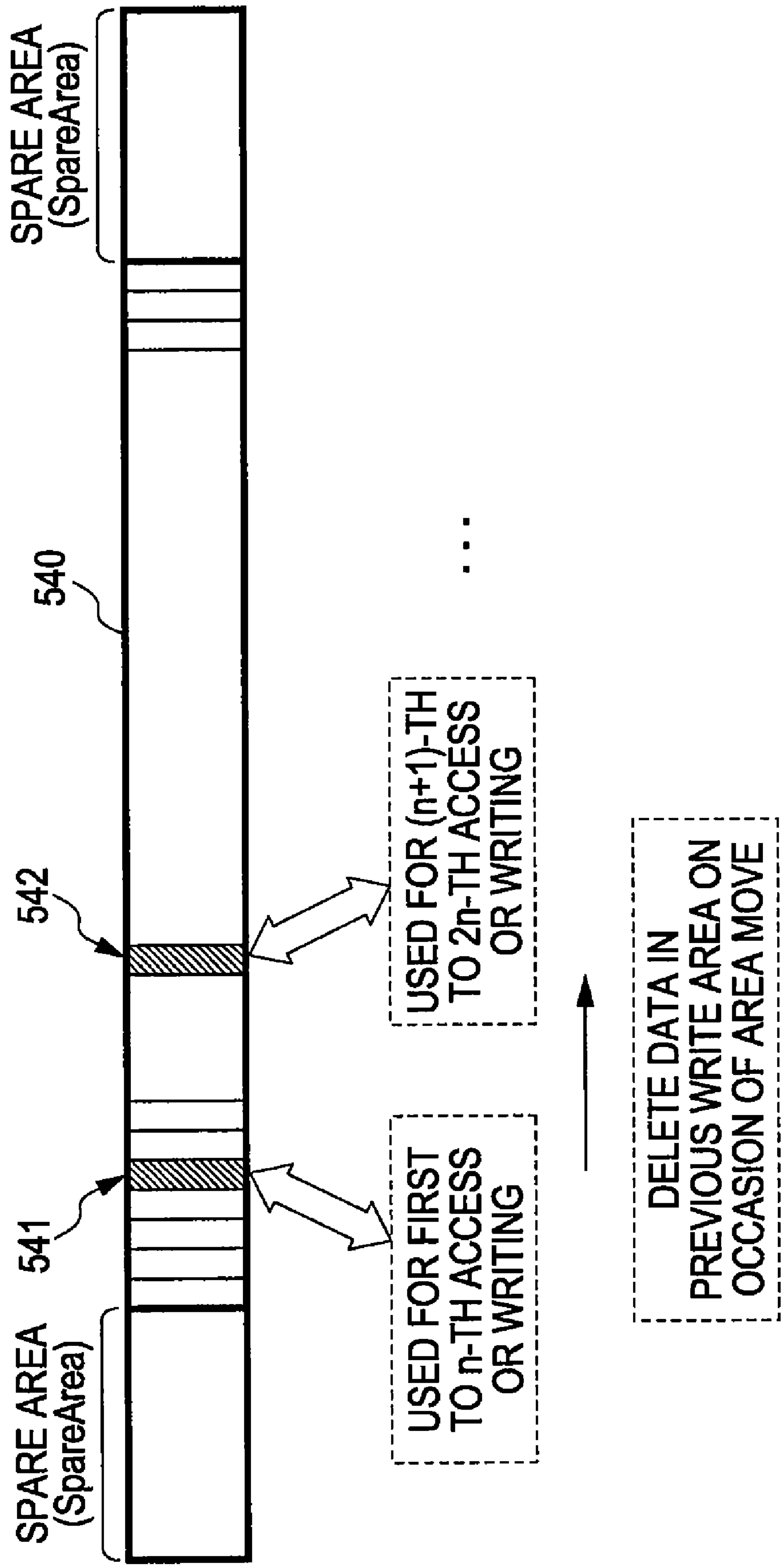
FIG. 35 is a diagram showing an example scheme for recording a unit key file, in which remaining of a unit key file due to a write error is prevented.

For example, referring to FIG. 35, an ECC block A 541 for a unit key file, set in a user area 540, is used form the first to n-th access or writing, and a new ECC block B 542 for a unit key file, set in the user area 540, is used for (n+1)-th and subsequent access or writing.

Each of the ECC block A 541 for a unit key file and the ECC block B 542 for a unit key file includes a plurality of user control data (UCD) and user data areas described earlier with reference to FIGS. 27A to 27C, a bind seed is recorded in a part of user control data (UCD) constituting each ECC block, and a CPS unit key file is recorded in a part of a user data area constituting the ECC block.

By prohibiting writing of data to a single ECC block more than a predetermined number of times as described above, an upper limit is imposed on the number of times of rewriting in the same area, so that a plurality of times of occurrence of write error or writing of data to a spare area due to occurrence of an error can be prevented. This serves to prevent a situation where CPS unit key files of a plurality of generations are recorded in a spare area.

When the area for recoding the CPS unit key file is changed, data in the previous recording area is deleted. For example, the area for writing a CPS unit key file, written in an ECC block area whose use has been finished, is overwritten with dummy data. Alternatively, it is possible to clear only the bind seed.

In both deleting and recording a CPS unit key file, it is anticipated that an illegitimate program could intervene the host and drive to notify the host of completion of deletion or recording when deletion or recording has not actually been completed. Thus, in a preferable processing sequence, the host should read a relevant area again after the deletion or recording to check whether processing has been executed appropriately.

7. Recording, Editing, and Playback of Content

Figure 36:
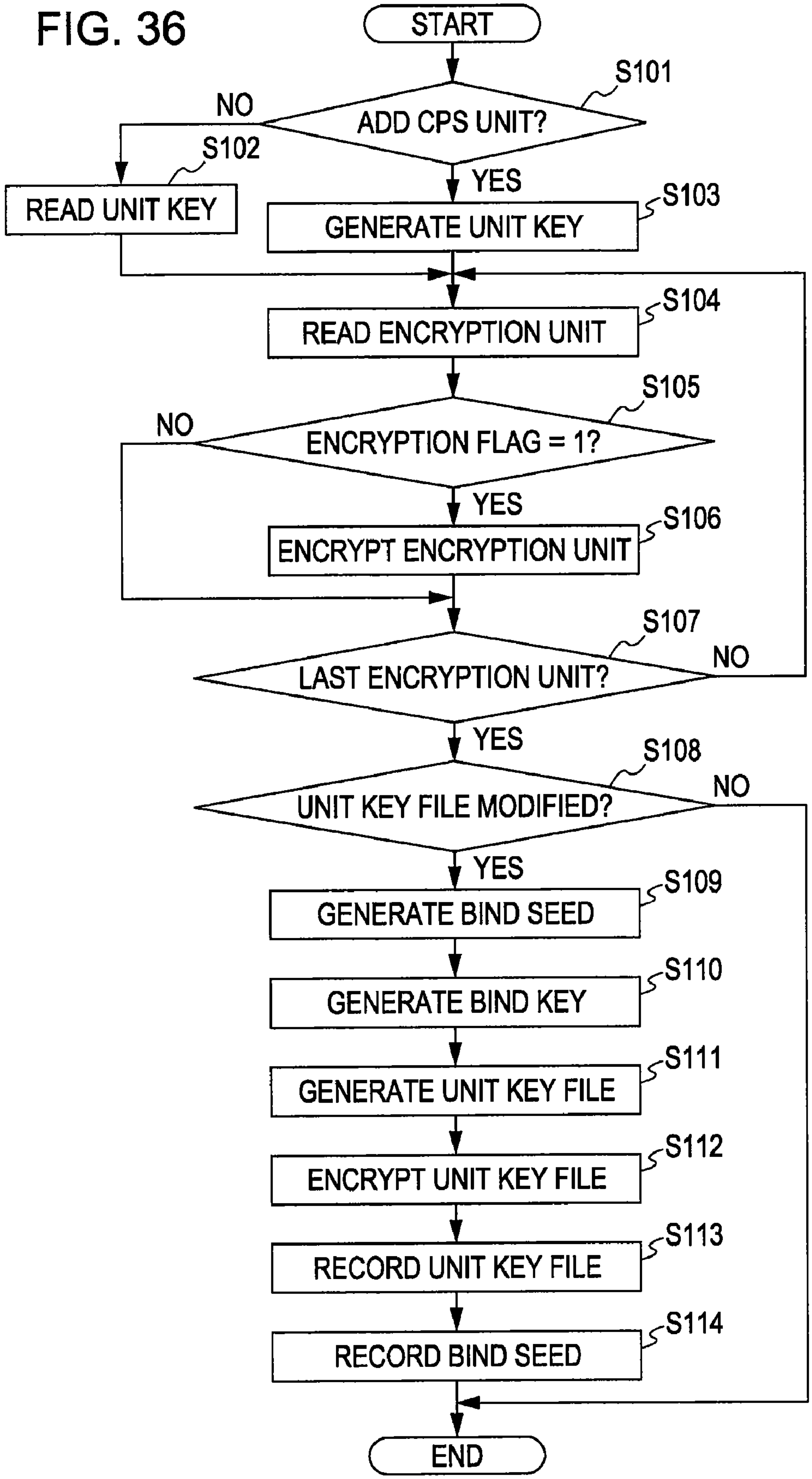
FIG. 36 is a flowchart showing the sequence of a process for recording data including content management units (CPS units)

Next, a sequence of execution of a content recording process in which usage control is exercised on a basis of content management units (CPS units) will be described with reference to a flowchart shown in FIG. 36. This process is executed under the control according to a data recording process program executed by an information processing apparatus having mounted thereon an information recording medium that allow recording data thereon. Content to be recorded is, for example, broadcast content or content input via a network such as the Internet or a LAN.

First, in step S101, it is checked whether it is needed to newly add a CPS unit associated with content to be recorded. When the setting is such that a CPS unit already set to the information recording medium is used so that the content is included in the CPS unit, a CPS unit is not added, and in step S012, a unit key is read from a CPS unit key recorded on the information recording medium. On the other hand, when a new CPS unit is to be set for the content to be recorded, in step S103, a CPS unit key associated with the new CPS unit is generated. For example, the key is generated by generating a random number.

Then, in step S104, an encryption unit of the content to be recorded is obtained. The content is divided into units of a predetermined data amount, and encryption need flag associated with the individual units are assigned to control information. The flags assigned are, for example:

Unit encryption needed=1

Unit encryption not needed=0

In step S105, an application that executes a recording process checks a flag associated with a unit to determine whether encryption is needed.

An encryption unit is a unit by which switching of control information is allowed in broadcasting or input from the Internet, and is not limited to a specific size or time length. Also, an encryption flag is not limited to a specific flag, and it refers to, for example, information for checking the need for encryption including processing by a recording apparatus for checking the need for encryption in accordance with change in copy control information described in CCI information attached to an input signal.

When the encryption flag of an encryption unit is not 1, the unit need not be encrypted, so that the process proceeds to step S107. When the encryption flag of an encryption unit is 1, the unit needs to be encrypted. Thus, in step S106, encryption is executed using a CPS unit key. The process then proceeds to step S017.

In step S107, it is checked whether the processing has proceeded to the last encryption unit of the content to be recorded. When any unit is remaining, the process returns to step S104, and the same process is repeated. When it is determined in step S107 that the process has reached the last encryption unit of the content to be recorded, the process proceeds to step S108, in which it is checked whether updating of the unit key file is needed. When a CPS unit key is added or deleted, it is determined that updating is needed. When no CPS unit key is added or deleted, it is determined that updating is not needed, and the process is exited.

When a CPS unit key is added or deleted and it is determined that updating is needed, a bind seed is generated in step S109, a bind key based on the bind seed is generated in step S110, a unit key file is generated in step S111, the CPS unit key file is encrypted using the bind key in step S112, the unit key file is recorded on an information recording medium in step S113, and the process of recording the bind seed is exited in step S114. Steps S109 to S114 are executed according to the sequence described earlier with reference to FIG. 30 when executed as a process between a host and a drive.

Figure 37:
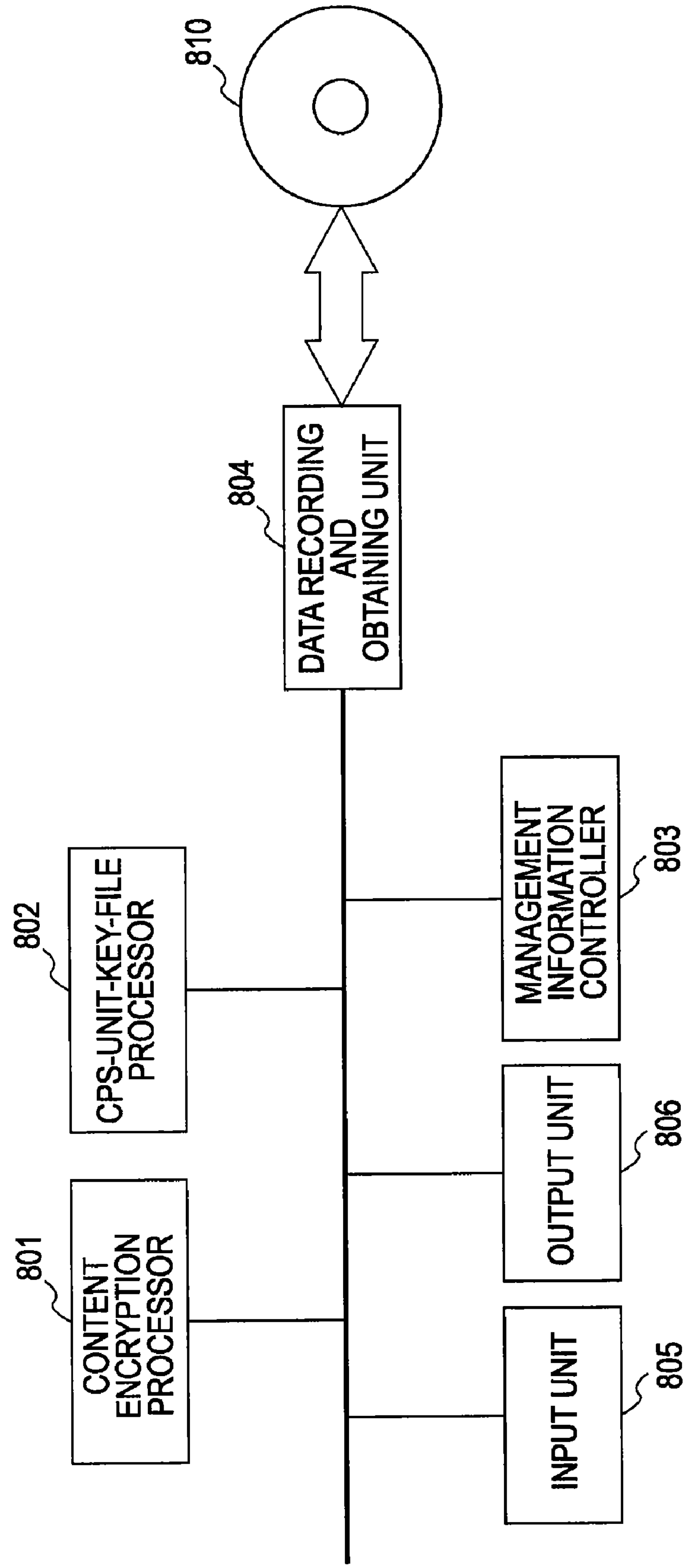
FIG. 37 is a block diagram showing functions of an information processing apparatus that executes a process of encrypting content and recording the encrypted content on an information recording medium and a process of decrypting, playing back, and using content recorded on an information recording medium.

FIG. 37 is a block diagram for explaining functions of an information processing apparatus that executes a process of encrypting content and recording the encrypted content on an information recording medium and a process of decrypting, playing back, and using content recorded on an information recording medium.

When content is recorded on an information recording medium 810, a content encryption processor 801 generates encrypted data associated with a content management unit (CPS) unit using a unit key associated with the content management unit, the content management unit being defined as a unit for controlling usage of content.

A CPS-unit-key-file processor 802 generates a bind key based on a bind seed, encrypts a unit key file using the bind key, and so forth. That is, a unit key file is generated by encrypting the unit key file or constituent data of the file using an encryption key that is generated using a seed whose value is updated in accordance with change in the constitution of unit keys included in the unit key file.

A management-information controller 803 checks association of content management units, unit key files, usage control information files for content management units, and so forth, checks the need for generating or updating various files, and so forth. A data recording and obtaining unit 804 records encrypted data, a unit key file, a usage control information file, and so forth on the information recording medium 810 according to a predetermined data recording format, and reads these pieces of data. The data recorded on the information recording medium 810 includes moving-image content composed of hierarchically structured data having index information, playlists, and clips including AV streams.

The CPS-unit-key-file processor 802 sets a new bind seed having a new value in accordance with an increase in the number of unit keys included in an existing unit key file recorded on the information recording medium 810 or a deletion of a unit key therefrom, and generates an updated unit key file that is encrypted using a new bind key based on the new bind seed.

That is, the CPS-unit-key-file processor 802 stores in the unit key file a new unit key that is newly set in accordance with recording of a new content management unit on the information recording medium, sets a new bind seed having a new value in accordance with addition of a new unit key, and generates an updated unit key file that is encrypted using a new bind key based on the new bind seed. Furthermore, the CPS-unit-key-file processor 802 deletes from the unit key file a unit key associated with a content management unit that is to be moved or deleted in accordance with a move or deletion of the content management unit from the information recording medium 810, sets a new bind seed having a new value in accordance with the deletion of the unit key, and generates an updated unit key file that is encrypted using a new bind key generated using the new bind seed.

As described earlier with reference to FIG. 29, the CPS-unit-key-file processor 802 encrypts the unit key file or the constituent data of the file using an encryption key that is generated through encryption of a bind seed using a media key, the media key being obtained through processing of an encryption-key block using a device key stored in an information processing apparatus.

As described earlier with reference to FIGS. 27A to 27C, the data recording and obtaining unit 804 records the bind seed in a user control data area that serves as a control information storage area, the user control data area being set at a recording location different from a recording location of a user data area where the unit key file is stored. Furthermore, as described earlier with reference to FIG. 33, the data recording and obtaining unit 804 writes the unit key file according to a recording format in which an area for writing the unit key file is set using an ECC block as a unit for accessing data on the information recording medium 810.

Furthermore, the data recording and obtaining unit 804 changes the location of writing to the information recording medium 810 in accordance with the number of times of writing of or access to the unit key file, and deletes at least a part of data written at a location before the change, such as a bind seed.

Furthermore, when content recorded on the information recording medium 810 is played back, the content encryption processor 801 decrypts encrypted content read by the data recording and obtaining unit 804 from the information recording medium, using a unit key associated with a content management unit that is defined as a unit for controlling usage of content.

The CPS-unit-key-file processor 802 obtains a unit key associated with a content management unit from a unit key file recorded on the information recording medium 810. At this time, the CPS-unit-key-file processor 802 generates an encryption key using a seed obtained from the information recording medium, the seed serving as key generation information, and obtains the unit key by decrypting the unit key file or constituent data of the file using the encryption key generated.

As described earlier with reference to FIG. 29, the CPS-unit-key-file processor 802 decrypts the unit key file or the constituent data of the file using an encryption key that is generated by encrypting a bind seed using a media key, the media key being obtained through processing of an encryption-key block using a device key stored in an information processing apparatus.

As described earlier with reference to FIGS. 27A to 27C, the data recording and obtaining unit 804 obtains a bind seed from a user control data area that serves as a control information storage area, the user control data area being set at a recording location different from a recording location of a user data area where the unit key file is stored.

A data input unit 805 is used to receive input of content that is to be recorded, or content specification information or editing information from the user. A data output unit 806 is used, for example, to output content that is played back.

8. Example Configuration of Information Processing Apparatus

Next, an example hardware configuration of an information processing apparatus that executes recording or playback of content will be described with reference to FIG. 38.

Figure 38:
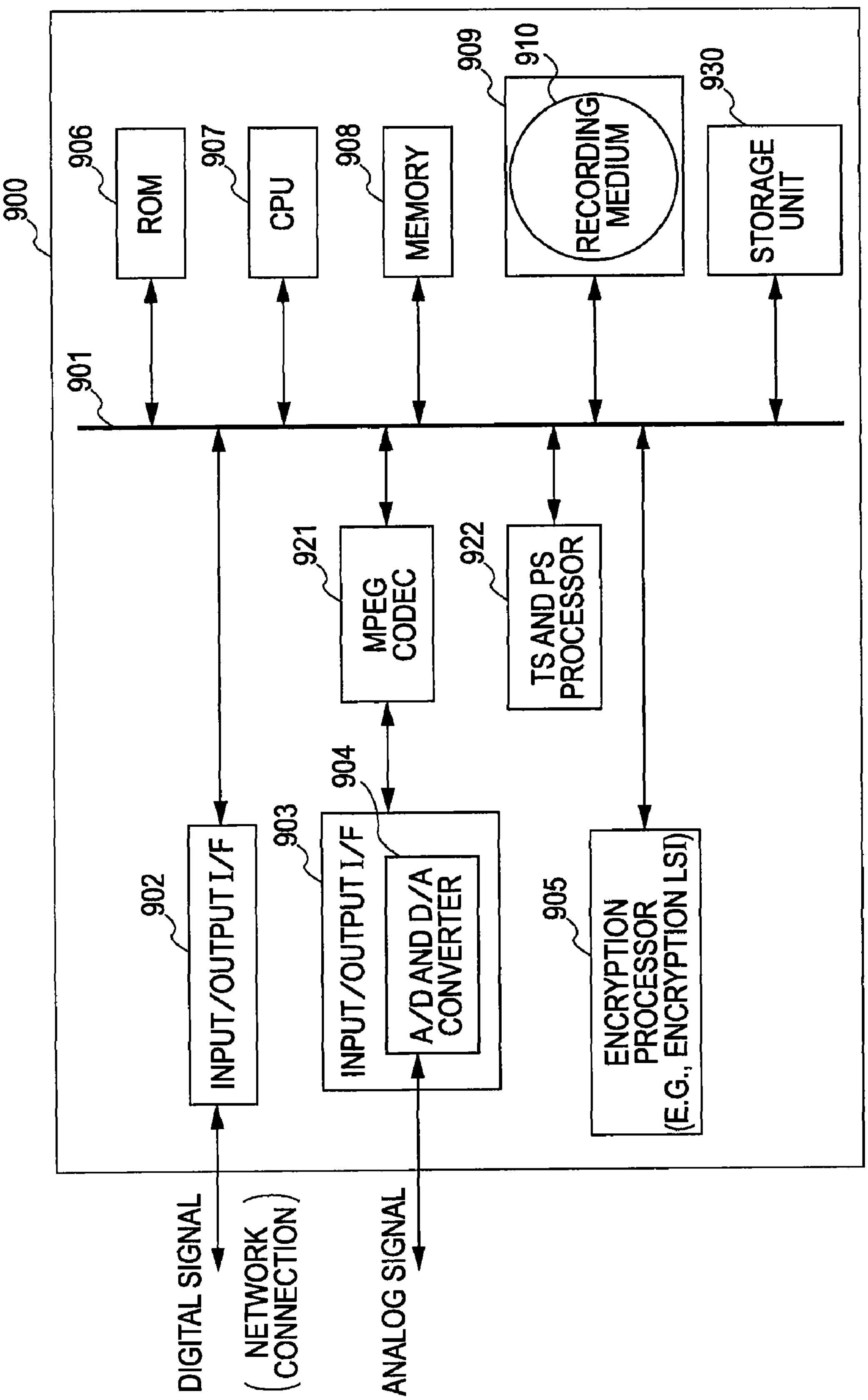
FIG. 38 is a diagram showing an example configuration of an information processing apparatus that executes playback or recording with an information recording medium mounted thereon.

Referring to FIG. 38, an information processing apparatus 900 includes a drive 909 that drives an information recording medium 910 and that inputs and outputs data recording and playback signals, a CPU 907 as a controller that executes data processing according to various programs, a ROM 906 as an area for storing programs, parameters, and so forth, a memory 908, an input/output I/F 902 that inputs and outputs digital signals, an input/output I/F 903 that inputs and outputs analog signals, including an A/D and D/A converter 904, an MPEG codec 921 that encodes and decodes MPEG data, a TS and PS processor 922 that processes a TS (transport stream) and a PS (program stream), an encryption processor 905 that executes various types of encryption processes, and a storage device 930 that serves as a local storage for storing various types of data and data processing programs, such as a hard disc. Each of these blocks is connected to a bus 901.

For example, when AV stream data composed of MPEG-TS data stored on the information recording medium 910 is played back by the information processing apparatus 900, data read from the information recording medium 910 by the drive 909 is decrypted by the encryption processor 905 as needed, and the decrypted data is divided by the TS and PS processor 922 into pieces of data such as video data, audio data, and subtitle data.

Furthermore, digital data decoded by the MPEG codec 921 is converted into analog signals for output by the D/A converter 904 in the input/output I/F 903. In the case of digital output, MPEG-TS data decrypted by the encryption processor 905 is output as digital data via the input/output I/F 902. In this case, the output is directed to a digital interface such as an IEEE 1394 interface, an Ethernet cable, or a wireless LAN. When internetworking is to be allowed, the input/output I/F 902 is provided with a function of network connection.

When data is converted within the information processing apparatus 900 before output into a format acceptable by a device at an output destination, rate conversion and codec conversion are executed by the MPEG codec 921 on the video data, audio data, subtitle data, and so forth once separated by the TS and PS processor 922, and digital data multiplexed again with MPEG-TS or MPEG-PS is output from the digital input/output I/F 902. Alternatively, conversion into a non-MPEG format and multiplexed file may be executed under the control of the CPU 907 for output from the digital input/output I/F 902.

Management information associated with CPS units, such as usage control information and a CPS unit key file, is read from the information recording medium 910 and then stored in the memory 908. The CPS unit key file is decrypted using a bind key through the process described earlier, thereby obtaining a CPS unit key.

Next, an operation executed by the information processing apparatus 900 for recording data obtained, for example, by receiving broadcast signals will be described. Two types of data that is to be recorded can be assumed, namely, input of digital signals and input of analog signals. In the case of digital signals, data input from the digital input/output I/F 902 and encrypted suitably by the encryption processor 905 as needed is saved on the information recording medium 910.

When the data format of the input digital signals is converted before the data is saved, the data is converted by the MPEG codec 921, the CPU 907, and the TS and PS processor 922 into a data format for saving, and the data is saved on the information recording medium 910 after being suitably encrypted by the encryption processor 905 using CPS unit keys as described earlier. In the case of analog signals, analog signals input to the input/output I/F 903 is converted into digital signals by the A/D converter 904, and the digital signals are converted by the MPEG codec 921 into a format for recording.

Then, the data is converted by the TS and PS processor 922 into a recording format of AV multiplexed data, and the data is saved on the information recording medium 910 after being encrypted suitably by the encryption processor 905 as needed.

When information used in the information processing apparatus 900 is obtained via an external network, data obtained is temporarily saved in the memory 908 in the information processing apparatus 900. The data saved is, for example, key information for used to play back content, data played back together when content is played back, such as subtitles, audio data, or still-image data, and content management information such as content usage control information (CCI).

Programs for executing playback and recording are stored in the ROM 906. When the programs are executed, the memory 908 is used as needed as an area for storing parameters and data and as a work area. Although the configuration of an apparatus that is capable of recording and playing back data is shown in FIG. 38, it is possible to implement an apparatus that is only capable of playback or that is only capable of recording, similarly to the embodiments described above.

Although the embodiments of the present invention have been described above, obviously, it is possible for those skilled in the art to make modifications or alternatives of the embodiments without departing from the spirit of the present invention. That is, the present invention has been described by way of examples, and the present invention should not be construed restrictively. The spirit of the present invention should be construed according to the claims.

The series of processes described in this specification can be executed by hardware, by software, or by combination of hardware and software. When the processes are executed by software, programs in which processing sequences are recorded are installed and executed in a memory of a computer embedded in special hardware, or the programs are installed and executed on a general-purpose computer that is capable of executing various processes.

For example, the programs can be recorded in advance on a hard disc or a read-only memory that serves as a recording medium. Alternatively, the programs may be temporarily or permanently stored (recorded) on a removable recording medium such as a flexible disc, a compact disc read-only memory (CD-ROM), a magneto-optical (MO) disc, a digital versatile disc (DVD), a magnetic disc, or a semiconductor memory. Such a removable recording medium can be provided in the form of what is called package software.

Instead of installing the programs on a computer from the removable recording medium described above, the programs may be transferred by wireless to a computer from a downloading site or transferred by wire to a computer via a network such as a local area network (LAN) or the Internet, so that the computer can receive the programs transferred and install the programs on an internal recording medium such as a hard disc.

The various processes described in this specification may be executed in parallel or individually as needed or in accordance with the processing ability of an apparatus that executes the processes, instead of being executed sequentially in the orders described. A system in this specification refers to a logical combination of a plurality of apparatuses, and is not limited to one in which constituent apparatuses exist within the same case.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus for recording information on an information recording medium, the information processing apparatus comprising:

- a content cryptographic processor configured to generate encrypted content by executing encryption using a unit key associated with a content management unit that serves as a unit for controlling usage of content;
- a unit-key-file processor configured to:
  - (a) generate a unit key file storing the unit key; and
  - (b) encrypt the unit key file or constituent data of the unit key file using an encryption key that is generated using a seed whose value is updated in accordance with a change in constituent data of unit keys included in the unit key file; and
- a data recorder configured to record the content management unit including the encrypted content as constituent data and the unit key file on the information recording medium according to a predetermined data recording format, wherein the data recorder is configured to:
  - (a) change a writing location on the information recording medium in accordance with the number of times of writing of or the number of times of access to the unit key file when writing the unit key file; and
  - (b) delete at least a part of data written to a location before changing the writing location.

2. The information processing apparatus according to claim 1, wherein the unit-key-file processor is configured to:

- (a) set a new seed having a new value in accordance with an increase in the number of unit keys included in an existing unit key file recorded on the information recording medium or deletion of a unit key from the existing unit key file; and
- (b) generate an updated unit key file that is encrypted using a new encryption key based on the new seed.

3. The information processing apparatus according to claim 1, wherein the unit-key-file processor is configured to:

- (a) store in the unit key file a new unit key that is newly set in accordance with recording of a new content management unit on the information recording medium;
- (b) set a new seed having a new value in accordance with addition of the new unit key; and
- (c) generate an updated unit key file that is encrypted using a new encryption key based on the new seed.

4. The information processing apparatus according to claim 1, wherein the unit-key-file processor is configured to:

- (a) delete from the unit key file a unit key associated with a content management unit that is to be moved or deleted in accordance with a move or deletion of the content management unit from the information recording medium;
- (b) set a new seed having a new value in accordance with the deletion of the unit key; and
- (c) generate an updated unit key file that is encrypted using a new encryption key based on the new seed.

5. The information processing apparatus according to claim 1, wherein the unit-key-file processor is configured to encrypt the unit key file or the constituent data of the unit key file using an encryption key that is generated through encryption of the seed using a media key, the media key being obtained by processing of an encryption-key block using a device key stored in the information processing apparatus.

6. The information processing apparatus according to claim 1, wherein the data recorder is configured to record the seed in a user control data area that serves as a control information storage area, the user control data area being set at a recording location different from a recording location of a user data area where the unit key file is stored.

7. The information processing apparatus according to claim 1, wherein the data recorder is configured to write the unit key file according to a recording format in which an area for writing the unit key file is set using an error-correcting-code block as a unit for accessing data on the information recording medium.

8. The information processing apparatus according to claim 1, wherein the data deleted includes seed information.

9. The information processing apparatus according to claim 1, further comprising:

a drive that executes access to the information recording medium; and a host that executes processing for accessing the information recording medium via the drive, wherein:

(a) the drive is configured to generate the seed; and (b) the host is configured to:

(i) generate an encryption key using the seed generated by the drive; and (ii) generate a unit key file encrypted using the encryption key.

10. An information processing method for recording information on an information recording medium, the information processing method comprising:

generating encrypted content by executing encryption using a unit key associated with a content management unit that serves as a unit for controlling usage of content;

generating a unit key file storing the unit key;

encrypting the unit key file or constituent data of the unit key file using an encryption key that is generated using a seed whose value is updated in accordance with change in constituent data of unit keys included in the unit key file; and recording the content management unit including the encrypted content as constituent data and the unit key file on the information recording medium according to a predetermined data recording format, wherein a writing location on the information recording medium is changed in accordance with the number of times of writing of or the number of times of access to the unit key file when writing the unit key file, and wherein at least a part of data written to a location is deleted before changing the writing location.

11. A computer readable medium storing a computer program for allowing a computer to execute a process of recording information on an information recording medium, the computer program causing the computer to:

generate encrypted content by executing encryption using a unit key associated with a content management unit that serves as a unit for controlling usage of content;

generate a unit key file storing the unit key;

encrypt the unit key file or constituent data of the unit key file using an encryption key that is generated using a seed whose value is updated in accordance with change in constituent data of unit keys included in the unit key file; and record the content management unit including the encrypted content as constituent data and the unit key file on the information recording medium according to a predetermined data recording format, wherein a writing location on the information recording medium is changed in accordance with the number of times of writing of or the number of times of access to the unit key file when writing the unit key file, and wherein at least a part of data written to a location is deleted before changing the writing location.

* * * * *